(12) United States Patent
Kolesnikov

(10) Patent No.: US 8,685,235 B2
(45) Date of Patent: Apr. 1, 2014

(54) INTEGRATED SEWAGE TREATMENT PLANT

(75) Inventor: Vladimir Petrovich Kolesnikov, Rostov-on-Don (RU)

(73) Assignees: Vladimir Petrovich Kolesnjkov, Rostov-on-Don (RU), part interest; Dmitry Vladimirovich Kolesnikov, Rostov-on-Don (RU), part interest ( * ) Notice: Subject to any disclaimer, the term of this patent is extended or adjusted under 35 U.S.C. 154(b) by 316 days.

(21) Appl. No.: 13/065,089

(22) Filed: Mar. 14, 2011

(65) Prior Publication Data
US 2011/0163022 A1    Jul. 7, 2011

Related U.S. Application Data

(63) Continuation-in-part of application No. PCT/RU2010/000026, filed on Jan. 20, 2010, and a continuation-in-part of application No. PCT/RU2010/000481, filed on Sep. 9, 2010.

(30) Foreign Application Priority Data

| | | |
|---|---|---|
| Feb. 4, 2009 | (RU) | 2009-103724 |
| Nov. 23, 2009 | (RU) | 2009-143268 |
| Apr. 6, 2010 | (RU) | 2010-113444 |

(51) Int. Cl.

| | |
|---|---|
| *C02F 3/04* | (2006.01) |
| *C02F 3/10* | (2006.01) |
| *C02F 3/24* | (2006.01) |
| *C02F 3/12* | (2006.01) |
| *C02F 1/30* | (2006.01) |
| *C02F 1/28* | (2006.01) |
| *C02F 1/72* | (2006.01) |
| *C02F 3/28* | (2006.01) |
| *C02F 3/30* | (2006.01) |
| *C02F 101/10* | (2006.01) |
| *C02F 101/16* | (2006.01) |
| *B01D 47/02* | (2006.01) |

(52) U.S. Cl.
CPC ... *C02F 3/24* (2013.01); *C02F 3/04* (2013.01); *C02F 3/043* (2013.01); *C02F 3/101* (2013.01); *C02F 3/121* (2013.01); *C02F 1/30* (2013.01); *C02F 1/28* (2013.01); *C02F 1/722* (2013.01); *C02F 3/28* (2013.01); *C02F 3/302* (2013.01); *C02F 2101/101* (2013.01); *C02F 2101/16* (2013.01); *C02F 2203/002* (2013.01); *C02F 2203/006* (2013.01); *B01D 47/02* (2013.01)
USPC ........ 210/151; 210/195.3; 210/259; 210/261; 210/615; 210/617; 210/626

(58) Field of Classification Search
USPC ........... 210/150, 151, 194, 195.1, 195.3, 254, 210/259, 261, 262, 615, 617, 620, 626
See application file for complete search history.

(56) References Cited

U.S. PATENT DOCUMENTS

| | | | | |
|---|---|---|---|---|
| 968,015 | A * | 8/1910 | Wilkie | 210/151 |
| 2,200,580 | A * | 5/1940 | Pruss et al. | 210/617 |
| 3,543,937 | A * | 12/1970 | Choun | 210/150 |
| 3,623,976 | A * | 11/1971 | Cessna | 210/615 |
| 4,086,307 | A * | 4/1978 | Glaspie | 210/150 |
| 5,049,265 | A * | 9/1991 | Boyd et al. | 210/150 |
| 5,223,129 | A * | 6/1993 | Hsieh | 210/150 |
| 5,460,722 | A * | 10/1995 | Chen | 210/615 |
| 5,702,594 | A * | 12/1997 | Yamasaki et al. | 210/151 |
| 5,702,604 | A * | 12/1997 | Yamasaki et al. | 210/151 |
| 6,048,459 | A * | 4/2000 | Khudenko | 210/617 |
| 6,217,759 | B1 | 4/2001 | Kolesnikov et al. | |
| 7,087,158 | B2 * | 8/2006 | Miyamoto et al. | 210/151 |
| 7,300,570 | B2 * | 11/2007 | Yang et al. | 210/151 |

FOREIGN PATENT DOCUMENTS

| | | |
|---|---|---|
| GB | 2 165 831 | 4/1986 |
| RU | 2 085 515 C1 | 7/1997 |
| RU | 2 114 070 C1 | 6/1998 |
| RU | 2 114 792 C1 | 7/1998 |
| RU | 2 139 257 | 10/1999 |
| RU | 2 220 915 | 1/2004 |
| RU | 2 310 499 | 11/2007 |

| | | | |
|---|---|---|---|
| RU | 2 390 503 C1 | 5/2010 | |
| SU | 1 020 379 | 5/1983 | |
| SU | 1761690 A1 | 9/1992 | |

OTHER PUBLICATIONS

International Search Report of PCT/RU2010/000481, Jun. 9, 2011.
International Search Report of PCT/RU2010/000026.
Jagusch, L., Pueschel, S., "Aeration—a new method . . . ", Wasserwirtschaft—Wassertechnik, 1968, No. 5, pp. 160-166 (with English translation—three (3) pages).

* cited by examiner

*Primary Examiner* — Christopher Upton
(74) *Attorney, Agent, or Firm* — Collard & Roe, P.C.

(57) ABSTRACT

An integrated sewage biochemical treatment plant containing mechanical treatment devices, a sewage-and-sludge mixing chamber with a circulation pump and a combined biological treatment device, includes a plane feed biofilter, a spray line, collecting trays and drain collectors connected to water-jet aeratic columns sunk in the aeration zones, and aftertreatment devices. The combined biological treatment device whose capacity is 5 to 15,000 $m^3$/day has a biofilters spray line that includes trays with emptying fittings and reflecting disks, the distance from the trays emptying fittings upper ends to the disk reflectors is 0.8 to 2 m, and the distance between the trays centers and the distance between the trays fittings axes is 0.6 to 1.8 m.

12 Claims, 11 Drawing Sheets

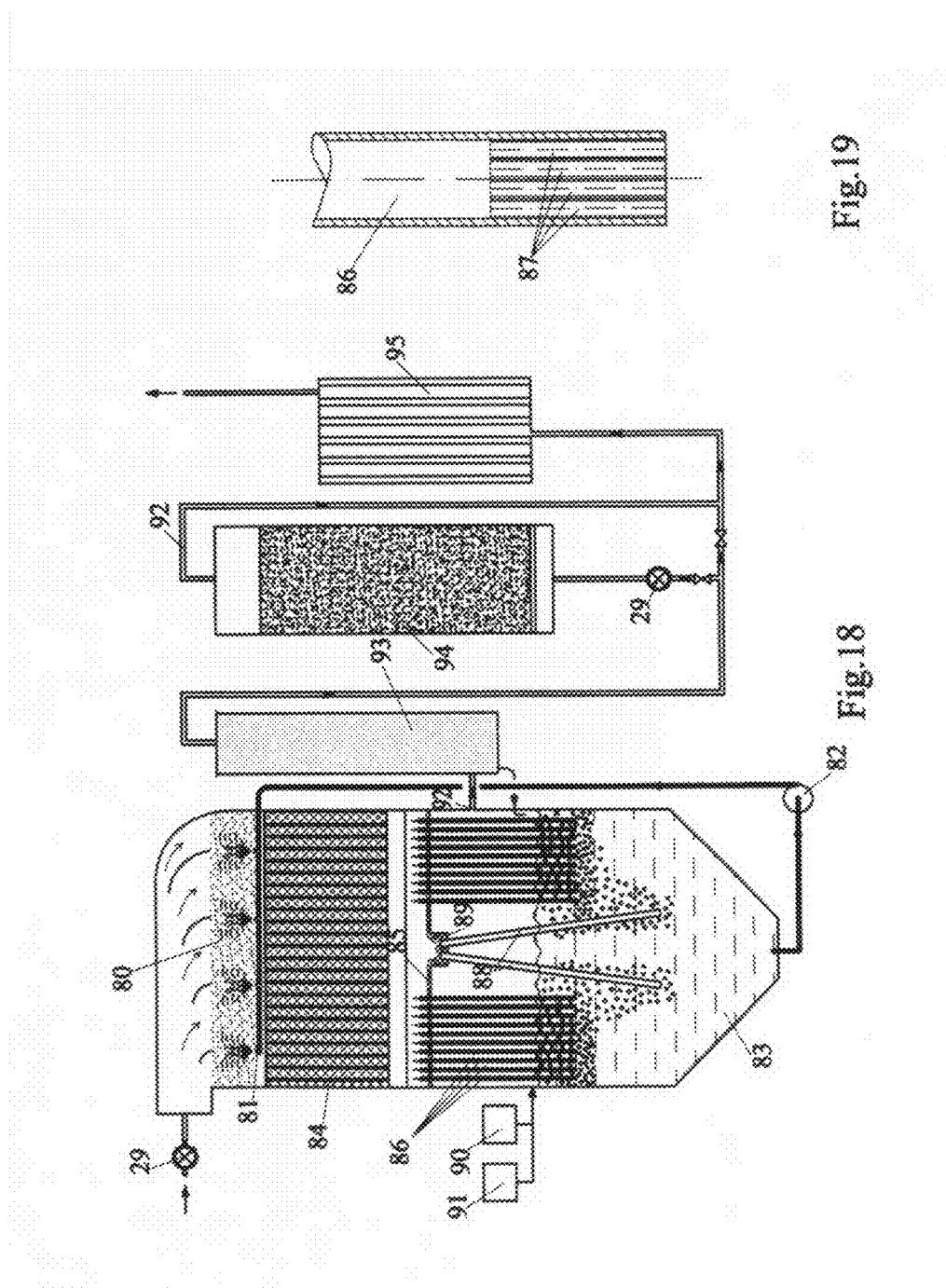

INTEGRATED SEWAGE TREATMENT PLANT

CROSS REFERENCE TO RELATED APPLICATIONS

Applicant claims priority on and this application is a continuation-in-part under 35 U.S.C. §120 of International Application No. PCT/RU2010/000026 filed Jan. 20, 2010, which claims priority under 35 U.S.C. §119 of Russian Application No. 2009-103724 filed on Feb. 4, 2009 and Russian Application No. 2009-143268 filed on Nov. 23, 2009. Applicant also claims priority on and this application is also a continuation-in-part under 35 U.S.C. §120 of International Application No. PCT/RU2010/000481 filed Sep. 9, 2010, which claims priority under 35 U.S.C. §119 of Russian Application No. 2010-113444 filed on Apr. 6, 2010. The International Applications under PCT article 21(2) were not published in English. Applicant claims priority under 35 U.S.C. §119 of Russian Application No. 2009-103724 filed on Feb. 4, 2009, Russian Application No. 2009-143268 filed on Nov. 23, 2009, and Russian Application No. 2010-113444 filed on Apr. 6, 2010. The disclosure of the aforesaid International Applications and Russian applications are incorporated by reference.

BACKGROUND OF THE INVENTION

1. Field of the Invention

The invention relates to the treatment of household and industrial sewage with the content of organic impurities in BOD making 50 to 50,000 mg/dm$^3$, suspended matters from 50 to 1,500 mg/dm$^3$, fats up to 300 mg/dm$^3$, which can be used for the purification of the waste water produced by dwelling-houses, villages, towns and cities, meat-packing plants, fish processing plants, canneries, cattle breeding farms, yeast factories, breweries, sugar-mills, pulp and paper mills, chemical and microbiological enterprises, etc. The invention is also designed to purify sewage with a high content of hydrosulfides and sulphuretted hydrogen (5 to 100 mg/dm$^3$), ammonia nitrogen (50 to 100 mg/dm$^3$) due to the decay of the organic impurities in the collectors and receivers of transfer pumping stations, receipt of detritus pit and cesspool sewage, as well as methane fermentation of anaerobic digesters.

2. The Prior Art

Known is an activated sludge treatment plant consisting of a biofilter located above the air-tank separator with delivery pipes for liquid jet aeration, attached to the biofilter collecting tray, a mixing chamber and a circulation pump (USSR Certificate of Authorship No. 1020379, MKI SO2 F3/02 publ. May 30, 1983). The device functions as follows: the sewage, after pretreatment (particulate pollutants removed), is driven to the mixing chamber together with the sludge mixture driven by hydrostatic head from the air-tank separator. Then the sewage-and-sludge mixture is circulated by the pump through the biofilter, delivery pipes (aeratic columns), and air-tank separator. The impurities are biologically oxidized by the biocenosis attached to the biofilter feed and active sludge microorganisms in the air-tank separator. When irrigated and driven through the biofilter, the sludge mixture is saturated with aerial oxygen. Additional saturation of the liquid with oxygen in the aeration tank and its content interfusion is due to the air-entraining of the delivery pipes (aeration columns), gas-liquid flow movement and air bubble floating. The advantages of this plant are: high sewage purification level due to the combination of the oxidative and better characteristics of the biofilter biocenosis and the aeration tank active sludge microflora; application, as a basic device, of a simple low pressure pump, and low power consumption (up to 0.5 kWt per a kilo of removed BOD). The biofilters blow away sulphuretted hydrogen and sorb hydrosulfides with the adapted sludge, which promotes effective purification of sewage with a high content of the said compounds. At the same time application of a single combined plant being a single unit is irrational for sewage treatment within the capacity range between 100 and 50,000 m$^3$/day since the hydrodynamical mode control of the plant becomes more complicated and a repair shutdown of some elements is impossible.

The biofilter's specific weight in the general purification effect of the combined plant may be raised and correspondingly the power consumption cut through a constructive design of the biofilter having a feed of spherically shaped ceramic elements with surface cavities (RF Patent No. 2310499 BO1D 53/18 publ. Nov. 20, 2007) developed for chemical mass-transfer apparatuses.

Known also is a strong sewage biochemical treatment plant, RF Patent No. 2139257, MKI SO2 F3/02, publ. Oct. 10, 1999, whose aeration tank and bioreactor are equipped with biological feed blocks of sheets provided with holes and bristles permitting to raise the gross amount of the active biomass, nitrifiers included.

The most similar by its critical limitations (prototype) to the claimed invention is the sewage biochemical treatment plant described in RF Patent No. 2220915, MKI SO2 F3/02, publ. Oct. 10, 2004. The combined plant biofilter irrigation evenness depends not just on the lock valves where the sewage-and-sludge mixture is driven to the trays, but also on the availability of the pressure reducing devices as the liquid is driven to the trays, because of the abrupt liquid wave motion at the initial sections. The biofilter feed irrigation evenness at a minimum consumption of power for driving the liquid to the irrigation system depends on both the level of the upper cuts at the emptying fittings to the reflective disks (1 to 1.5 m) and the distances between the trays and the distances between the emptying fittings. The dimensions of the emptying fittings (4 to 10 diameters) shown in this Patent provide density of the falling liquid jets and diversity of the liquid drops reflection pathways. At the same time, as there appears a layer of attached microflora on the inside surface of the fittings ($\beta \approx 1.5$ mm), the fittings diameter making 20 to 35 mm and their length exceeding 6 diameters, as well as due to the claws, abruptly falls the fittings' delivery capacity and raises their obstruction probability, which demands frequent cleaning.

The efficiency of the organic impurities oxidation in the combined plant biofilters depends on the feed design. A flat feed is blocks of corrugated sheets of various coarseness, which facilitates biomass growth in the feed upper section and excludes silting in the middle and lower sections.

However application of man-made dielectric materials like fiberglass, ceramoplastic, plastics, fails to provide sufficient clutch between the microflora and the feed surface. The manufacturing testing has shown that the best clutch between the biomass and the feed surface is performed by ceramics.

The combined plant water-jet aeration unit provides efficient saturation of liquid with oxygen and stirring of the aeration tank contents only in case of the aeration columns definite diameters and definite proportions between the columns height above the surface and the height of the sunk sections of the columns. A correct choice of parameters minimizes power consumption for sewage treatment. The efficiency of air-entraining in the columns is influenced by the conditions under which the sewage-and-sludge mixture gets to the sewage collectors, the horizontal distances between the upper cuts of the aeration columns, and the precision of fixing the upper cuts of the aeration columns in relation to the water level. The heliciform claws in the upper sections of the columns raise the clogging ability of the columns in case of long-fibered impurities. The prototype sewage biochemical treatment plant presupposes that to stir the aeration tank contents the pipes lower ends are evenly placed above the flat section of the aeration tank bottom at a distance of 0.2 to 0.3 m from it.

At the same time prevention of sludge deposition and decay with a minimum power consumption for the sludge mixture circulation, keeping the active biomass of the aeration zone in a suspended state, depend on both the aeration columns diameter, the admission charge ($m^3/h$) and the proportion of the aeration columns heights above and under the liquid level, as well as on the distances between the upper and lower columns cuts, distances between the columns ends and the angle of coupling between the flat and conic sections of the bottom and the even sludge diversion.

The sewage settlings optimally contain carbon, nitrogen, phosphorus and trace elements. However any possibility of using settlings as a fertilizer is restricted due to the vital capacity of helminths and odor nuisances as these are introduced into soil. Application of microwave frequency installations dehelmintizes the settlings completely. The excess sludge removed from the combined plants, is characterized by an optimal proportion of its biogenic elements, fine water yielding capacity and high mineralisation. Absence of primary settlers within the combined treatment plant flow schemes, aeration tanks and secondary settlers blocking excludes settlings deposition and decay and correspondingly any odor nuisances, unlike traditional plants whose settlings retain putrefactive ferments. That is why the excess sludge can be used as a fertilizer.

The major impacts on the biological sewage treatment are initial sewage and open air temperatures. The average cold weather sewage temperature in the towns and cities of Russia is between 15 and 17° C., while that in medium and small villages is 9 to 14° C. Within average aeration mode tanks, if air the temperature is minus 10 to 20° C., the liquid temperatures falls during treatment by 1 to 3° C., and within extended mode aeration tanks it falls by 4 to 9° C., which results in biological treatment deceleration or complete cessation. In the hot countries, high sewage and air temperatures, as well as direct sunlight, raise the treated liquid up to 35° C. and more, which also adversely effects air solubility and treatment speed. A closed design for sewage treatment plants partially solves the problem of liquid cooling or heating, yet the basic line of optimization of the plant's temperature mode and reduction of power consumption for air treatment is to raise the air oxygen use factor.

As the sewage is purified in the aeration tanks, there is a large number of bubbles that burst and thus form drops getting up to the atmosphere and carrying pathogenic microflora with themselves. This way the air is polluted with infectious and invasion diseases agents. To disinfect and deodorize the technological air, the plants are to be provided with air treatment devices. The three and four-stage air treatment schemes of the plants installed in the cities of Monaco, Nice, Antibes use wet hypochlorite, caustic soda treatment, and all fetid odors are removed with ozone, which makes air purification too expensive.

The objective as viewed by the designers of the new sewage biochemical treatment plant was to create such variants that would provide efficient and steady quality of treatment of sewage characterized by low and high organic impurities concentrations, high content of sulphuretted hydrogen and hydrosulfides, ammonium nitrogen, and raise the environmental safety of the purified sewage, particularly reduce the sanitary protection zone around the plant.

The solution of the designers' task resulted in technical terms in the raise of the plant's performance and stability of work at various concentrations of the impurities. Better performance and stability of work predetermined lower power consumption for sewage treatment, disinfection and used air deodorization. Above all, the plant enabled to utilize the waste producing granulated fertilizers.

SUMMARY OF THE INVENTION

The character of the invention is as follows: the integrated biochemical sewage treatment plant includes mechanical treatment devices, a sludge sewage mixing chamber with a circulation pump and a combined biological treatment device including a biofilter with plane feed, a spray line, collecting trays and drain collectors with water-jet aeratic columns sunk in the aeration zones, and pre-treatment devices; within the combined biological treatment device of 5 to 15,000 $m^3/day$ capacity, the biofilters spray line includes trays with emptying fittings and reflecting disks, the distance from the trays emptying fittings upper ends to the disk reflectors being 0.8 to 2 m, and the distance between the trays centers and the distance between the trays fittings axes being 0.6 to 1.8 m. The aeration columns diameter making from 25 to 100 mm, their height above the liquid level in the aeration settling tanks is 1.2 to 3.5 m, and the sinking height under the liquid level is 1.5 to 4 m. The distance between the upper columns cuts is 50 to 500 mm, and the distance between the lower aeration columns cuts is 0.5 to 3 m.

Besides, the character of the invention is as follows: the length of the emptying fittings installed in the spray line trays is within 2 to 6 diameters. The diameter of the reflecting disks is 80 to 200 mm. The pipelines driving the sewage-and-sludge mixture to the biofilter irrigating trays have shutters; additionally the trays beginnings have gates, and there are training plates before the initial emptying fittings.

At the same time, the character of the invention is as follows: the biofilter spray line trays are equipped with helium-neon lasers stimulating microflora growth, nitrification and denitrification.

Besides, the character of the invention is as follows: the biofilter feed elements are spheres of a 35 to 100 mm diameter with 4 to 10 cavities whose axes meet in the center of the sphere. The spheres have surface claws of 0.1 to 1.5 mm. Combinations of metals are included in the material of the elements.

At the same time, the character of the invention is as follows: the biofilter feed is made of corrugated ceramic sheets of 0.5 to 1.5 m width, 0.5 to 3 m height, and 2 to 4 mm thickness, with 0.1 to 2 mm surface claws (coarseness), a frame of parallel and longitudinal wavy bands of 3 to 10 mm width and thickness. Some part of the longitudinal bands are made as 10 to 35 mm wide obtrusive wavy partitions. Combinations of metals are included in the material of the sheets.

Besides, the character of the invention is as follows: the drain collector of the biofilter tray is equipped with a training reflector. The aeration columns upper section is made as fittings twisted into the sockets attached to the drain collector bottom. The drain collector is supplied with a little access to assemble fittings and for pipes cleaning.

At the same time, the character of the invention is as follows: the drain fittings of the biofilters spray lines and the fittings of the aeration columns upper sections have 1 to 1.5 revolutions high heliciform hollows of a height not more than 0.7 fitting's diameter.

Besides, the character of the invention is as follows: the outer perimeter of the partition detaching the biofilter space from the air-tank separator space, at a distance of 0.5 to 1.5 m from each other, has holes or air bypassing valves.

At the same time, the character of the invention is as follows: for the aeration columns diameters of 25 to 100 mm, the height of the columns lower cuts above the aeration zone bottom is 0.05 to 0.4 m, while the distance from the outermost aeration columns lower section to the coupling between the flat and conic parts of the air-tank separator bottom is 0.5 to 1.2 m.

Besides, the character of the invention is as follows: the length of the lower leg of the air-tank separator conic part equals half of the settling zone width plus 0.1 to 1.0 m. The height of the partition's conic part lower section separating the aeration zone from the settling zone down to the bottom, is 0.5 to 1.5 m. The width of the triangular rollers located on the aeration zone bottom's flat section, is 0.5 to 2.0 m, while their height is 0.5 to 1.5 m. The sludge discharging pipeline is mounted along the outer perimeter of the air-tank separator bottom's conic part and has holes or fittings placed under the angle of 0 to 90° C. to the pipeline's long axis and located at a distance of 0.2 to 1.0 m from each other.

At the same time, the character of the invention is as follows: above the rollers there are biological feed blocks made of plastic plates with 3 to 30 mm holes and 5 to 50 mm long bristles, or ceramic plates that include metal compounds, with attached pivots or plates of various lengths (5 to 40 mm) and claws (0.1 to 1.5 mm) creating coarseness.

Besides, the character of the invention is as follows: the plant consists of 2 to 4 combined biological treatment devices connected to the joint mixing chamber by pipelines removing the sludge from the aeration settling tanks. The head pipeline of the mixing chamber circulation pump is connected to the spray lines of the combined biological treatment biofilters.

At the same time, the character of the invention is as follows: the plant for integrated biochemical treatment of sewage with the organic impurities in BOD making up to 3,000 mg/dm$^3$ and fats up to 300 mg/dm$^3$, includes biocoagulators-flotators, combined biological treatment devices, a head pipeline circulation pump mounted within the mixing chamber of the second combined device and connected to the spray line of the same device, to the mixing chamber of the first combined device and to the water-jet aerator of the biocoagulator-flotator or to the excess sludge treatment device. The aerator's feed chamber has 0.3 m to 1.5 m long aeratic columns, their canting angles to the pintle being 0 to 50° C., and tangential fittings.

Besides, the character of the invention is as follows: the plant for integrated biochemical treatment of sewage with the organic impurities in BOD making up to 50,000 mg/dm$^3$, sulphuretted hydrogen and hydrosulfides, ammonium nitrogen up to 100 mg/dm$^3$, includes (for the impurities concentrations in BOD up to 3,000 mg/dm$^3$) mechanical treatment devices, and (up to 50,000 mg/dm$^3$ in BOD) anaerobic bioreactors, sewage-and-sludge mixing chamber with circulation pumps and combined biological treatment devices, with the sewage driving pipeline connected to the mixing chambers of the combined biological treatment devices. The head pipeline circulation pump mounted in the mixing chamber of the first combined device, is connected to both the spray line and the mixing chamber of the second combined device. Above all the head pipeline circulation pump mounted in the mixing chamber of the second combined device is connected to the spray line of the same device, to the mixing chamber of the first combined device, and to the excess sludge treatment device.

At the same time, the character of the invention is as follows: the anaerobic bioreactor device has circulating liquid distribution pipes sunk by 0.3 m to 2.5 m, mounted under canting angles of 0 to 70° C. to the pintle and provided with tangentional fittings.

Besides, the character of the invention is as follows: the mixing chambers of the first and/or second combined plants are connected to the hydrogen peroxide driving pipelines attached to them.

However, the character of the invention is as follows: installation is additionally equipped with denitrifiers and/or post-treatment bioreactor with artificial feed. Mixer is installed on the pipeline disposing clarified liquid from the first and/or the second combined-plants to denitrifiers. Force main of the first and/or the second combined plants' circulating pumps and pipelines feeding coagulant solution are attached to this mixer.

Besides, the character of the invention is as follows: the bioreactor feed is made of plastic or ceramic sheets with pivots or 10 to 100 mm long plates with 3 to 30 mm holes. The distances between the pivots or plates and the diameters of the holes gradually reduce from the top of the feed to its bottom. The sheets, pivots or plates have claws of 0.1 to 1.5 mm. The feed material includes metal compositions.

At the same time, the character of the invention is as follows: the plant additionally includes a sorption filter with a feed able of phosphate chemical adsorption, this filter connected to the combined biological treatment device and/or denitrifier and/or bioreactor.

Besides, the character of the invention is as follows: the plant additionally includes an excess sludge treatment device whose thickener has pipelines leading from the combined biological treatment device, and/or biocoagulator, and/or anaerobic bioreactor. The thickener is connected to the belt filter press whose dehydrated cake driving device is connected to the grainer, where also attached is a delivery line (for organic and/or mineral additives). The granule driving device is connected to the roller conveyor provided with electric heating elements, and/or to microwave frequency radiators successively mounted to the holding tank.

And finally, the character of the invention is as follows: In the installation for deep biological wastewater treatment the air ducts from the combined biological treatment devices, excess sludge treatment devices, bioreactors, integrated mechanical treatment device rooms and sand catchers are successively connected to the sucking fitting of a high pressure fan whose head air duct is in its turn connected to the irrigation chamber of the air treatment device. The device is equipped with a spray line connected to the circulation pump whose sucking fitting is connected to the air-fit section of the device. Above the air-fit section there is the devices' clip-on section filled with artificial feed, a collecting tray with direct air feeding pipes (their length is 1.2-2.5 m, they are 0.4 to 0.7 m sunk within the liquid of the air-fit section and filled in their lower section with small diameter pipes) and water-jet air ejection pipes that are attached to drain tank and are located at 0.6 to 1.8 m above the liquid and sunk within the liquid by 1 to 3 m. The air treatment device has a connection to the natrium hypochlorite solution tank, odorant solution tank and air duct in its turn connected to the water-drop eliminator that is successively connected to the activated carbon filter and ultraviolet disinfection unit.

The proof of the invention embodiment is shown by the definite examples of the variants of the plant for integrated biochemical treatment of the sewage of various contents of organic impurities, sulphuretted hydrogen, hydrosulfides, and ammonium nitrogen. These typical examples not at all restrict other versions of the invention, but only explain its essence.

BRIEF DESCRIPTION OF THE DRAWINGS

The definite examples of the variants of the sewage biochemical treatment plant are explained graphically, where:

FIG. 18: flow scheme of the used air treatment device;

FIG. 19: scaled-up section of the direct air delivery pipes.

DETAILED DESCRIPTION OF PREFERRED EMBODIMENTS

Figure 1:
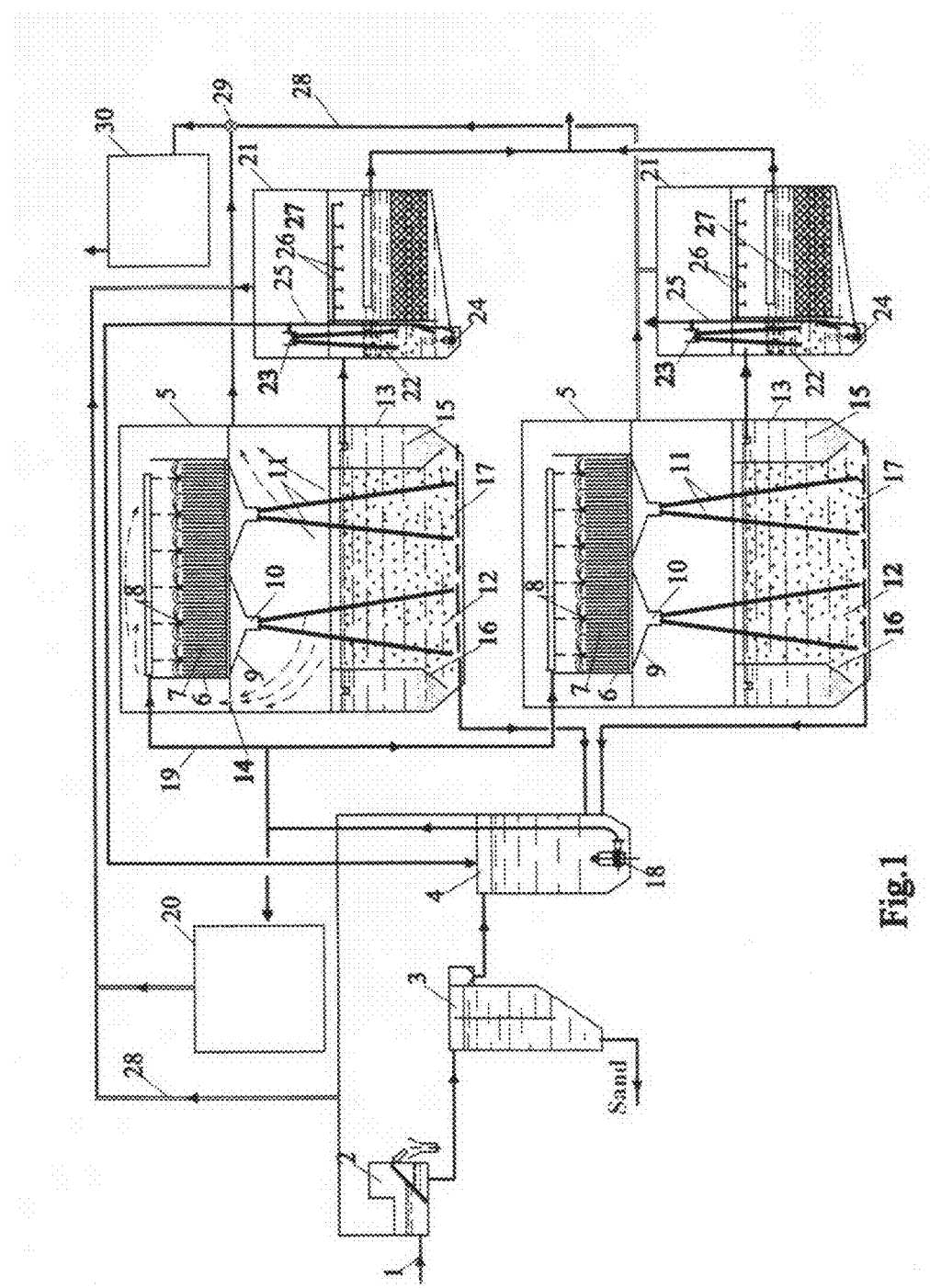
FIG. 1 schematically shows a variant of a flow scheme for an integrated sewage biochemical treatment plant, the impurities concentration in BOD being up to 1.000 mg/dm$^3$ and suspended matters up to 700 mg/dm$^3$.
Figure 2:
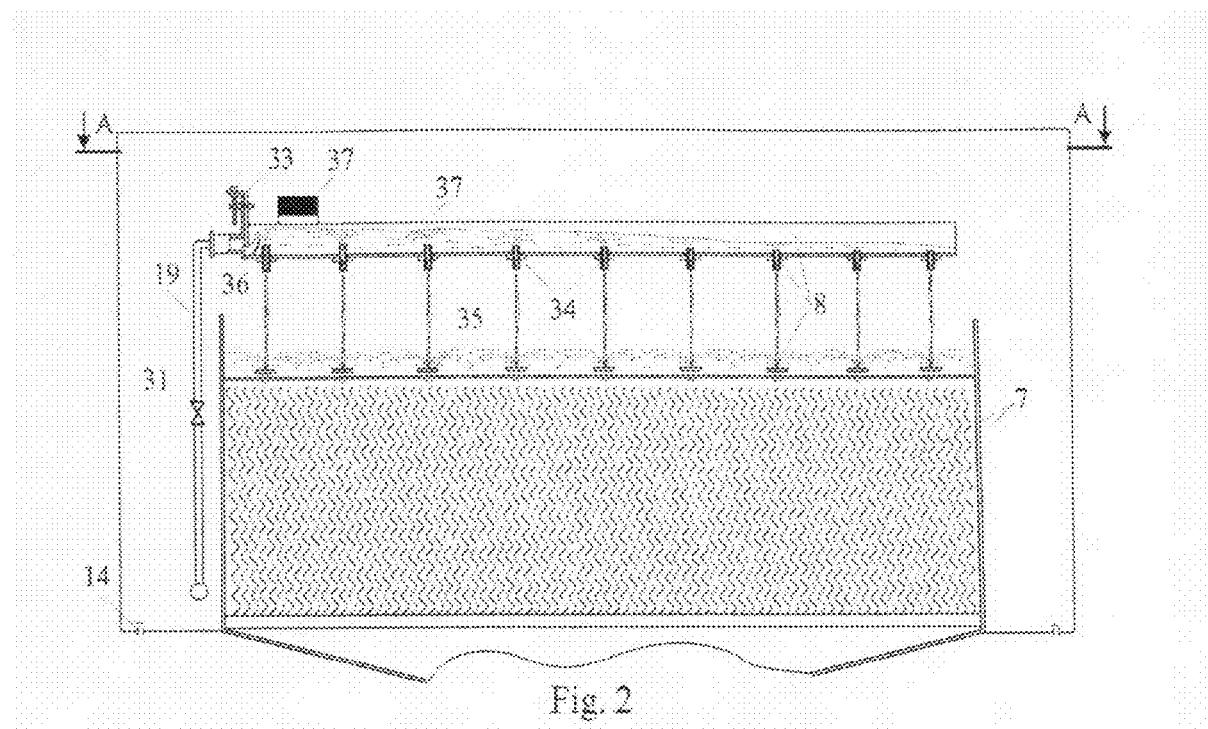
FIG. 2: scaled-up section of the biofilter shown in FIG. 1.
Figure 3:
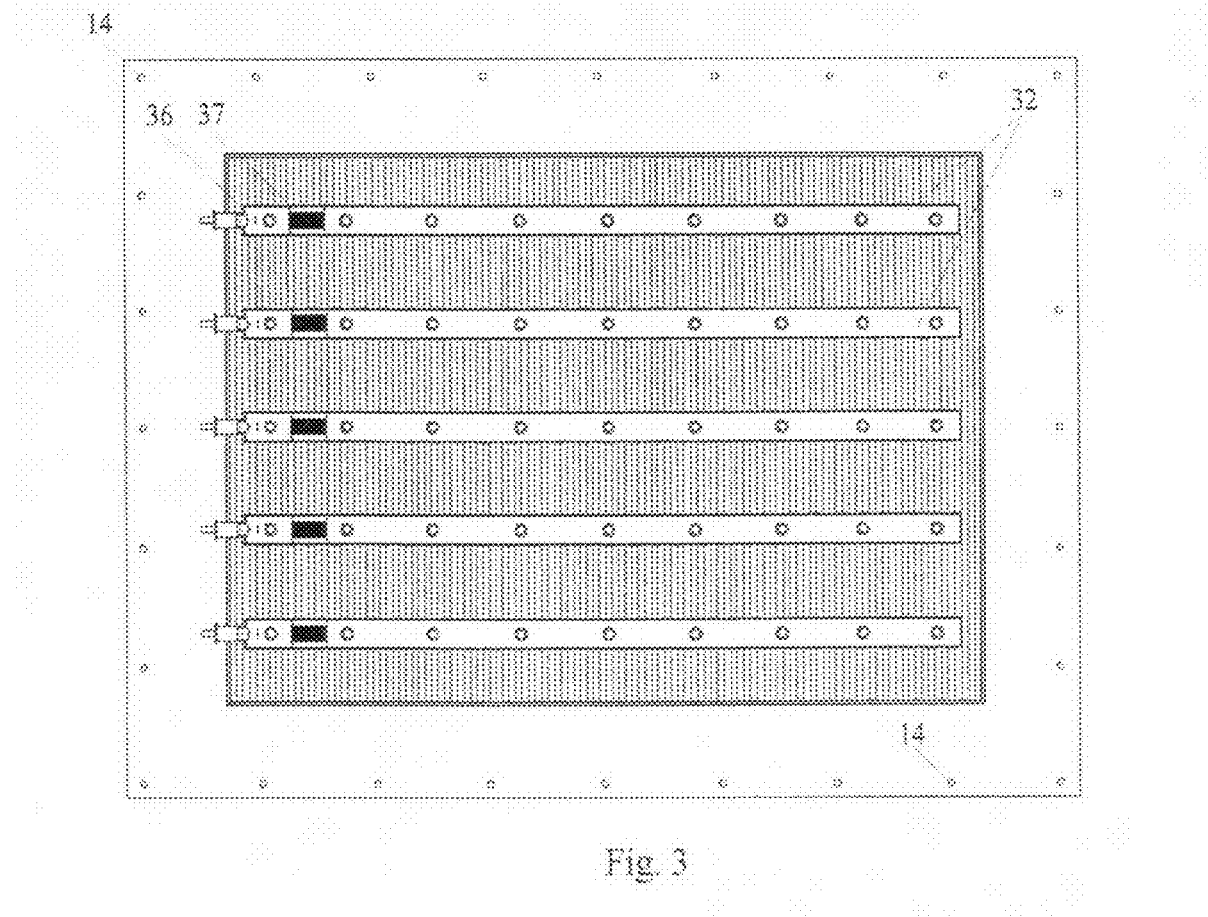
FIG. 3: section A-A of FIG. 2.
Figure 4:
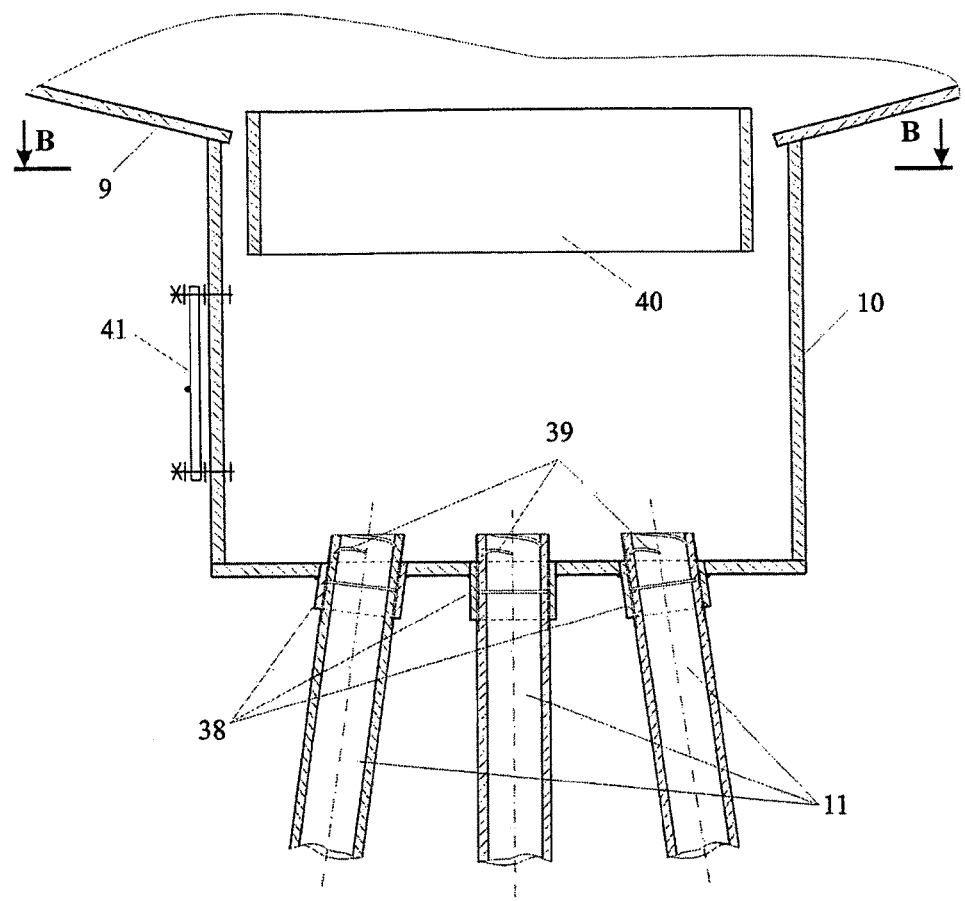
FIG. 4: scaled-up section of the biofilter collecting tray and drain collector shown in FIG. 1.
Figure 5:
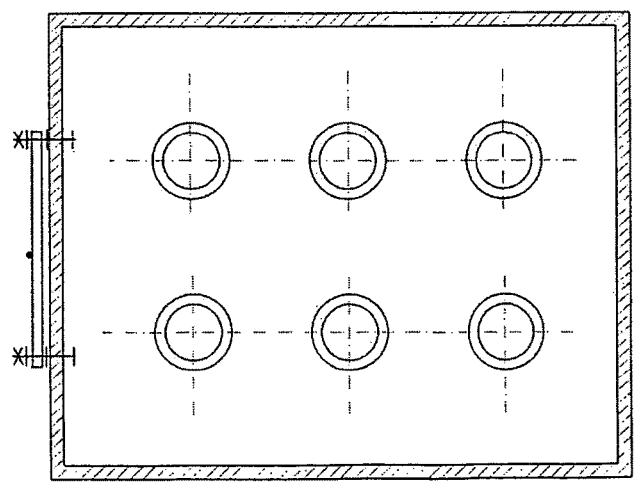
FIG. 5: section B-B of FIG. 4.
Figure 6:
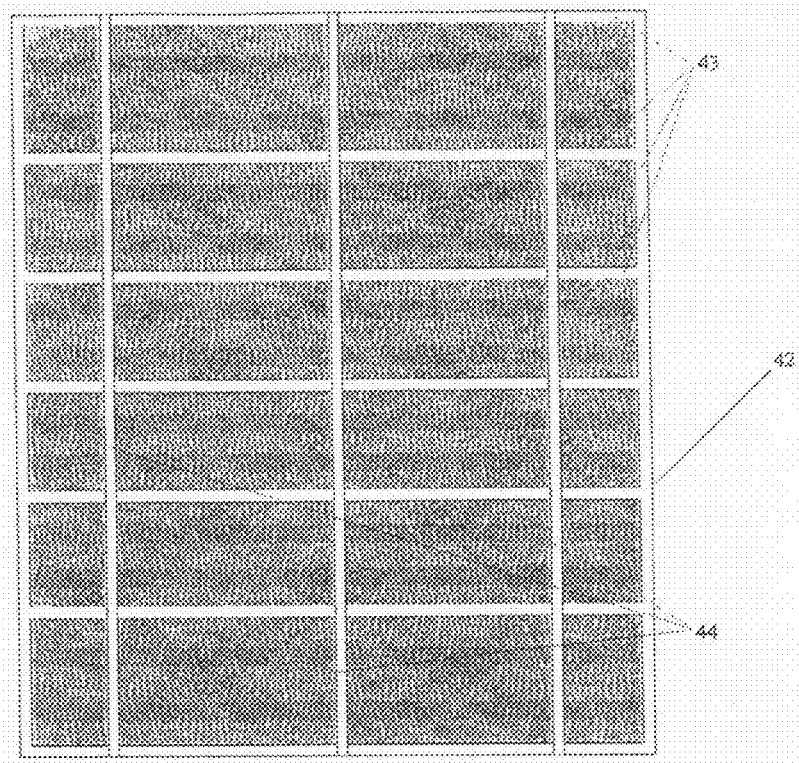
FIG. 6: foreground of the biofilter feed corrugated ceramic sheet.
Figures 7, 8, 9:
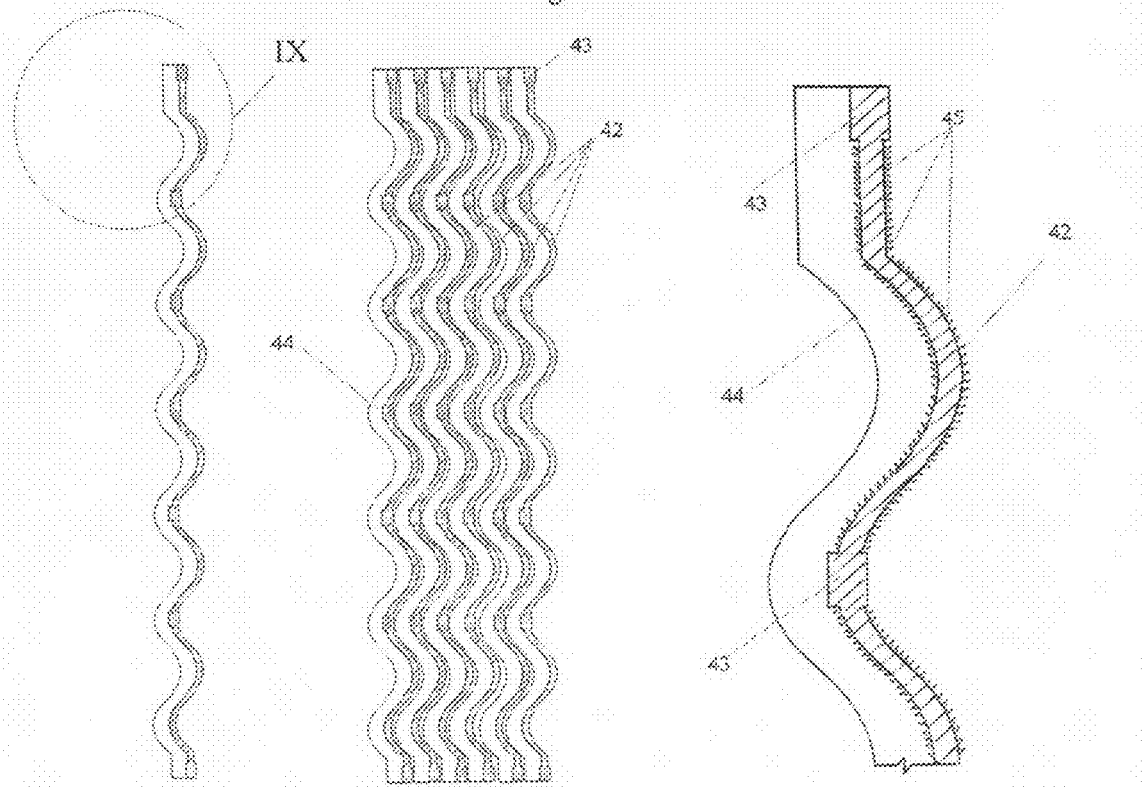
FIG. 7: section of a single corrugated ceramic sheet.
FIG. 8: section of several ready-fitted sheets.
FIG. 9: scaled-up fragment of a ceramic sheet from area IX of FIG. 7.
Figure 10:
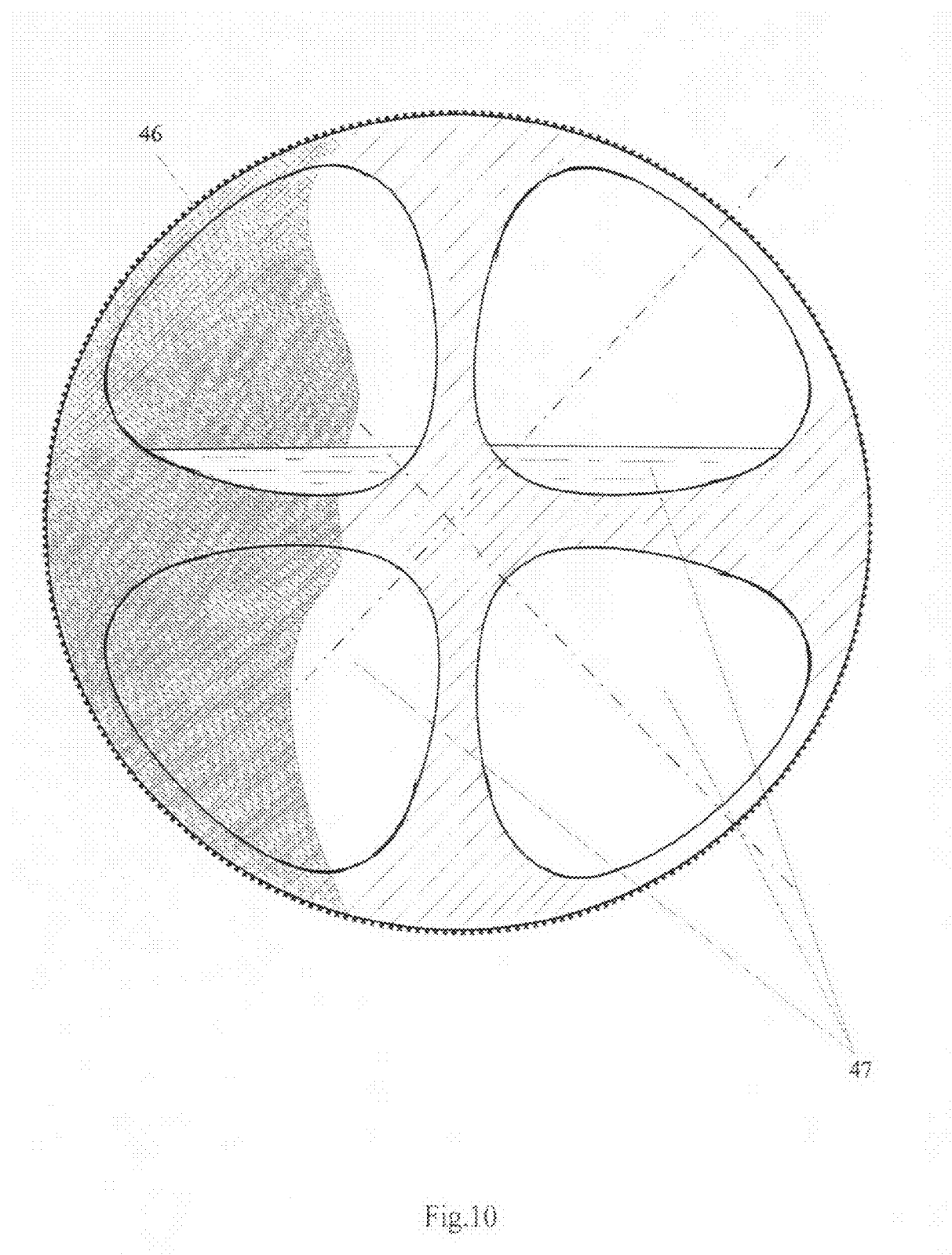
FIG. 10: section of a biofilter feed spheric element.
Figure 11:
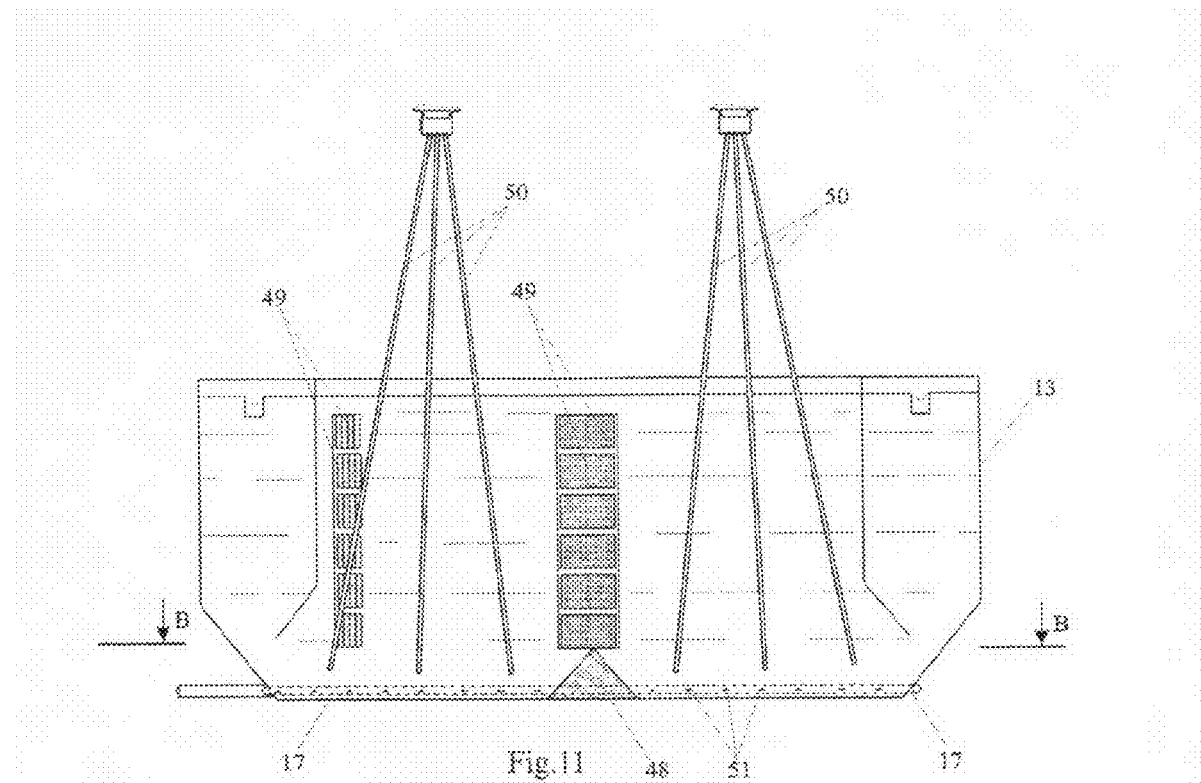
FIG. 11: scaled-up section A-A of the air-tank separator with triangular rollers, biological feed blocks, aeration columns and sludge driving pipeline.
Figure 12:
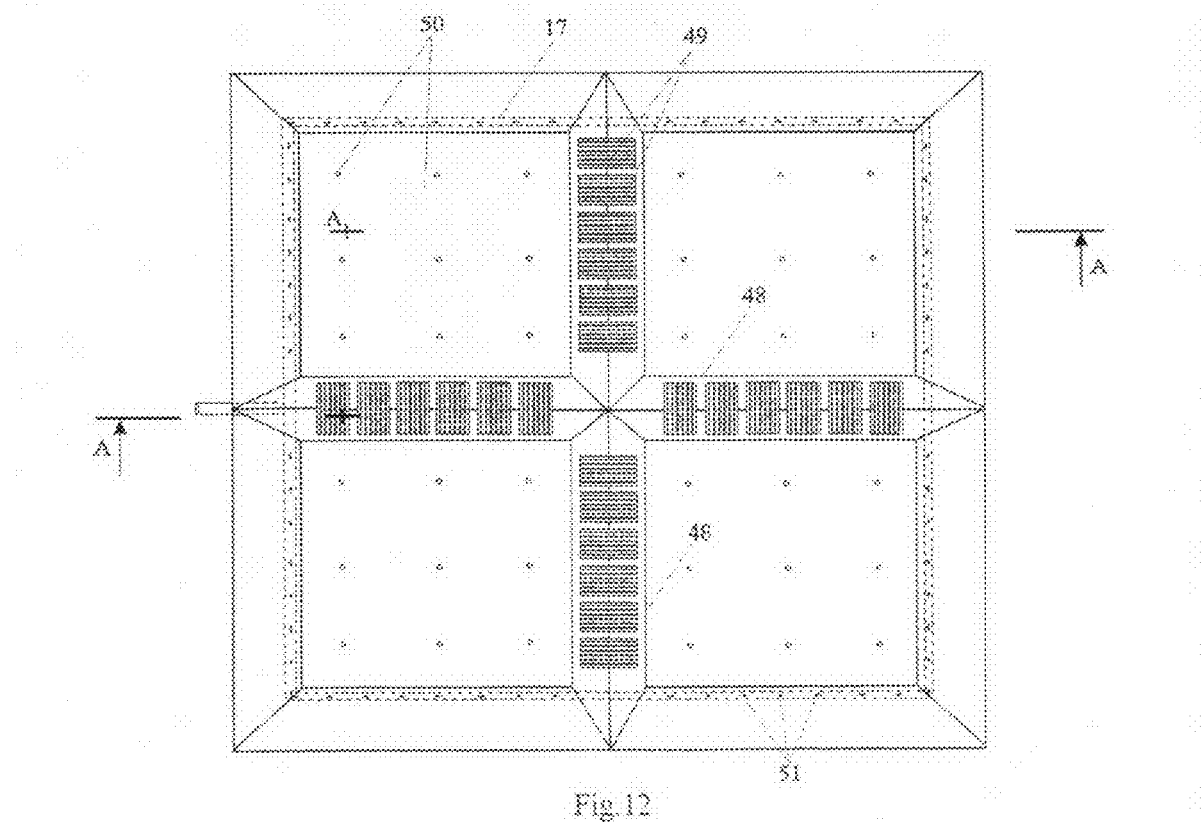
FIG. 12: section B-B of FIG. 2.
Figures 13, 14:
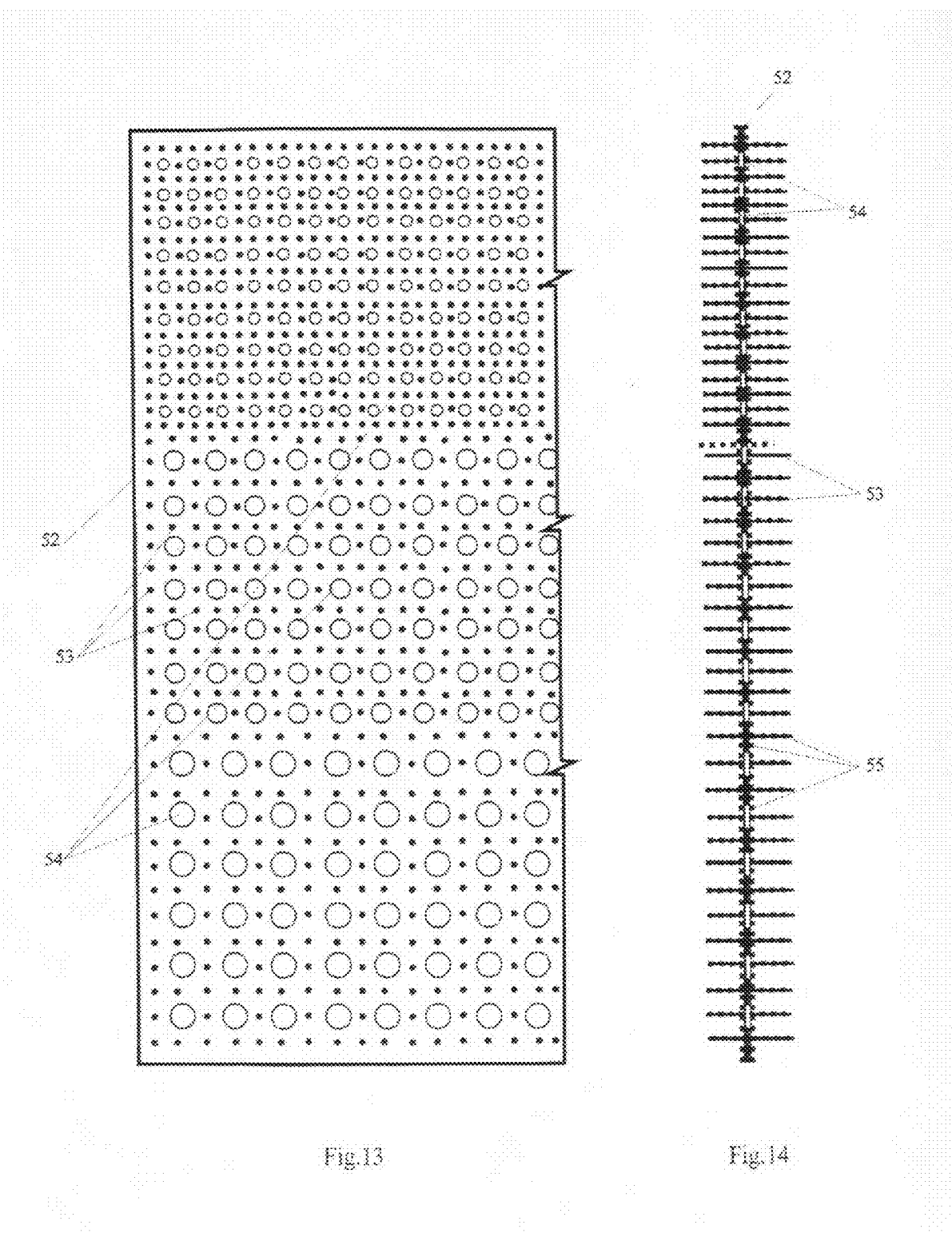
FIG. 13: foreground of a bioreactor feed sheet.
FIG. 14: section of a bioreactor feed sheet.
Figure 15:
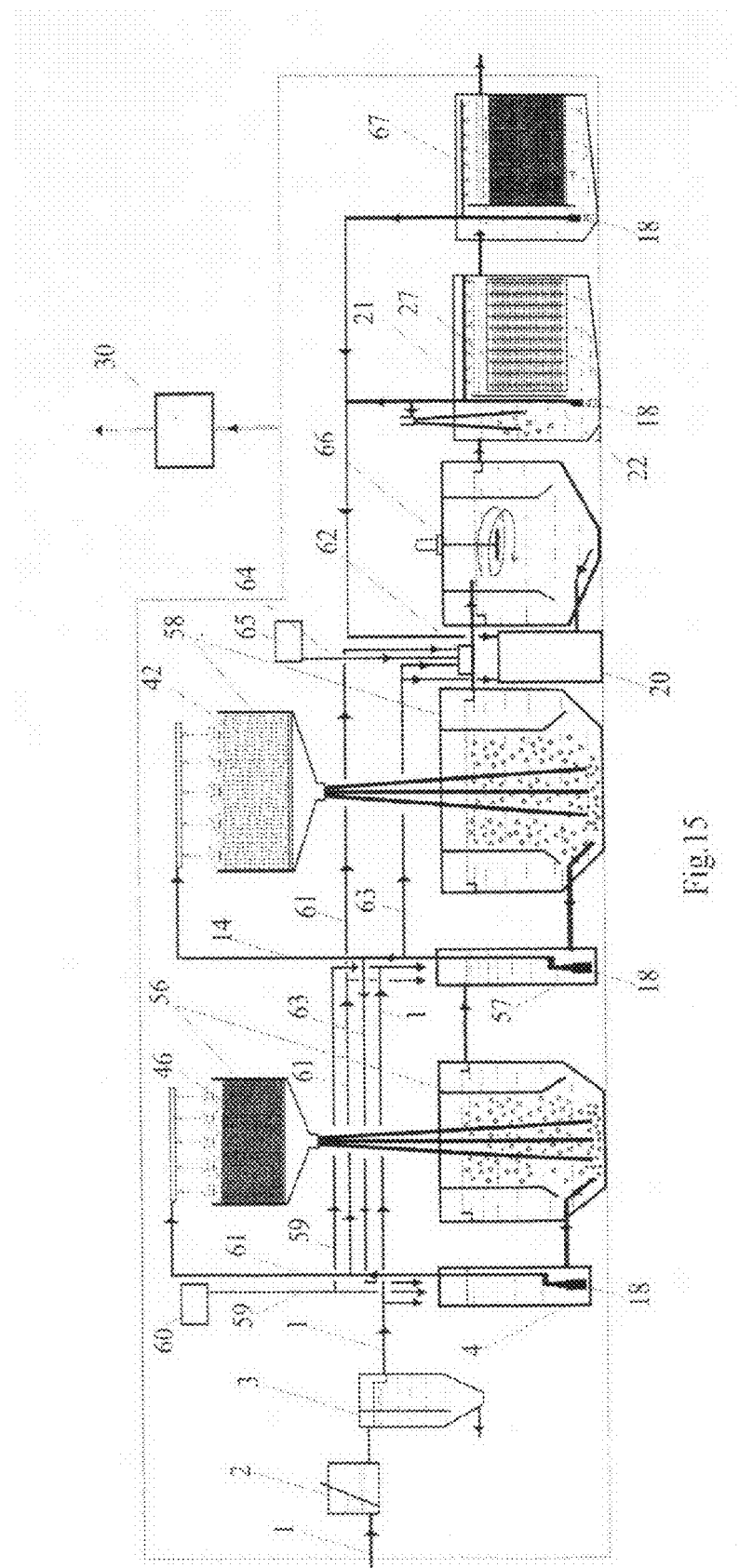
FIG. 15: schematically shows a variant of a flow scheme for an integrated sewage biochemical treatment plant, the impurities concentration in BOD being up to 1,500 mgO$_2$/dm$^3$, suspended matters up to 700 mg/dm$^3$, total sulphuretted hydrogen and hydrosulfides, ammonium nitrogen up to 100 mg/dm$^3$.
Figure 16:
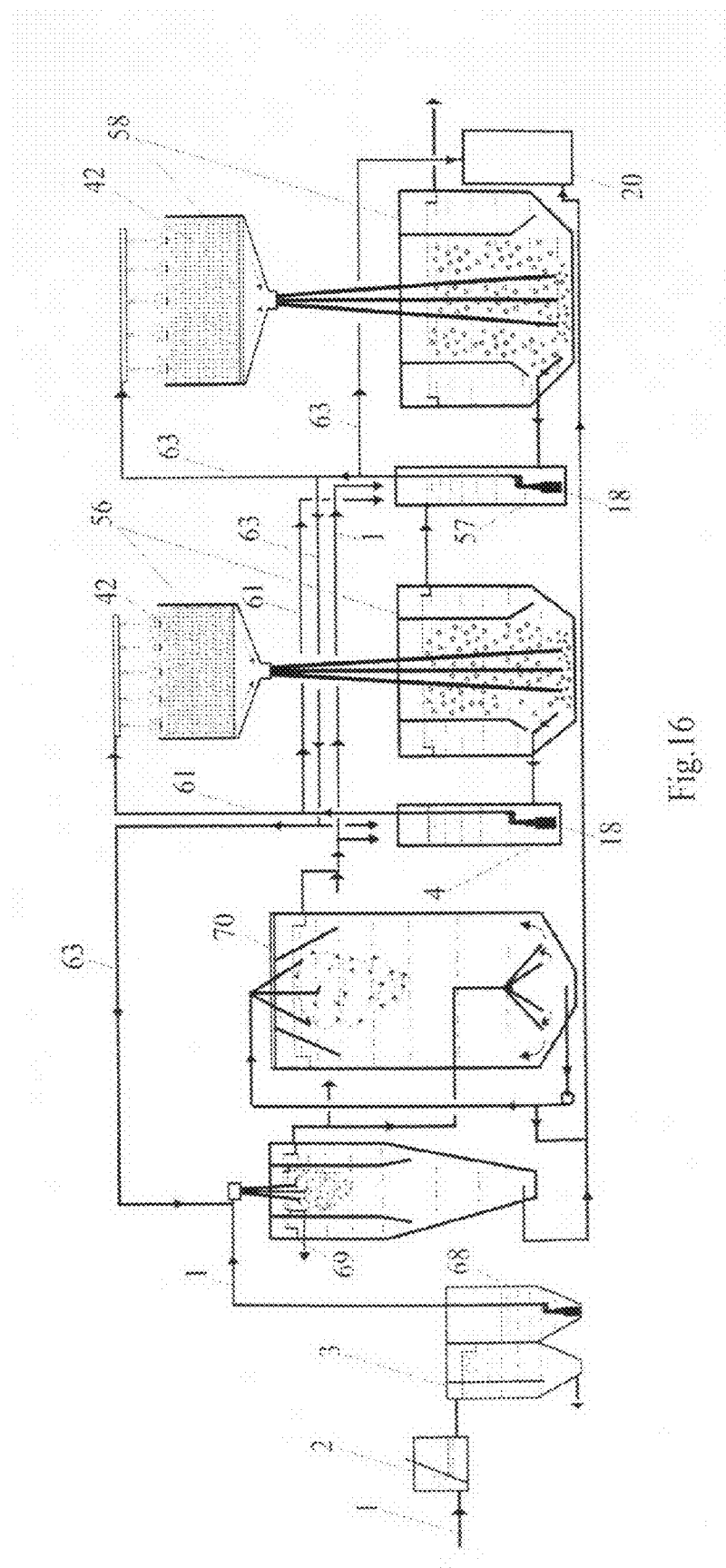
FIG. 16: schematically shows a universal variant of a flow scheme for an integrated sewage biochemical treatment plant, the organic impurities BOD being 1,500 to 3,000 mgO$_2$/dm$^3$, suspended matters up to 1,500 mg/dm$^3$ and fats up to 300 mg/dm$^3$, as well as a plant for the organic impurities concentrations in BOD equaling 3,000 to 50,000 mg/dm$^3$.
Figure 17:
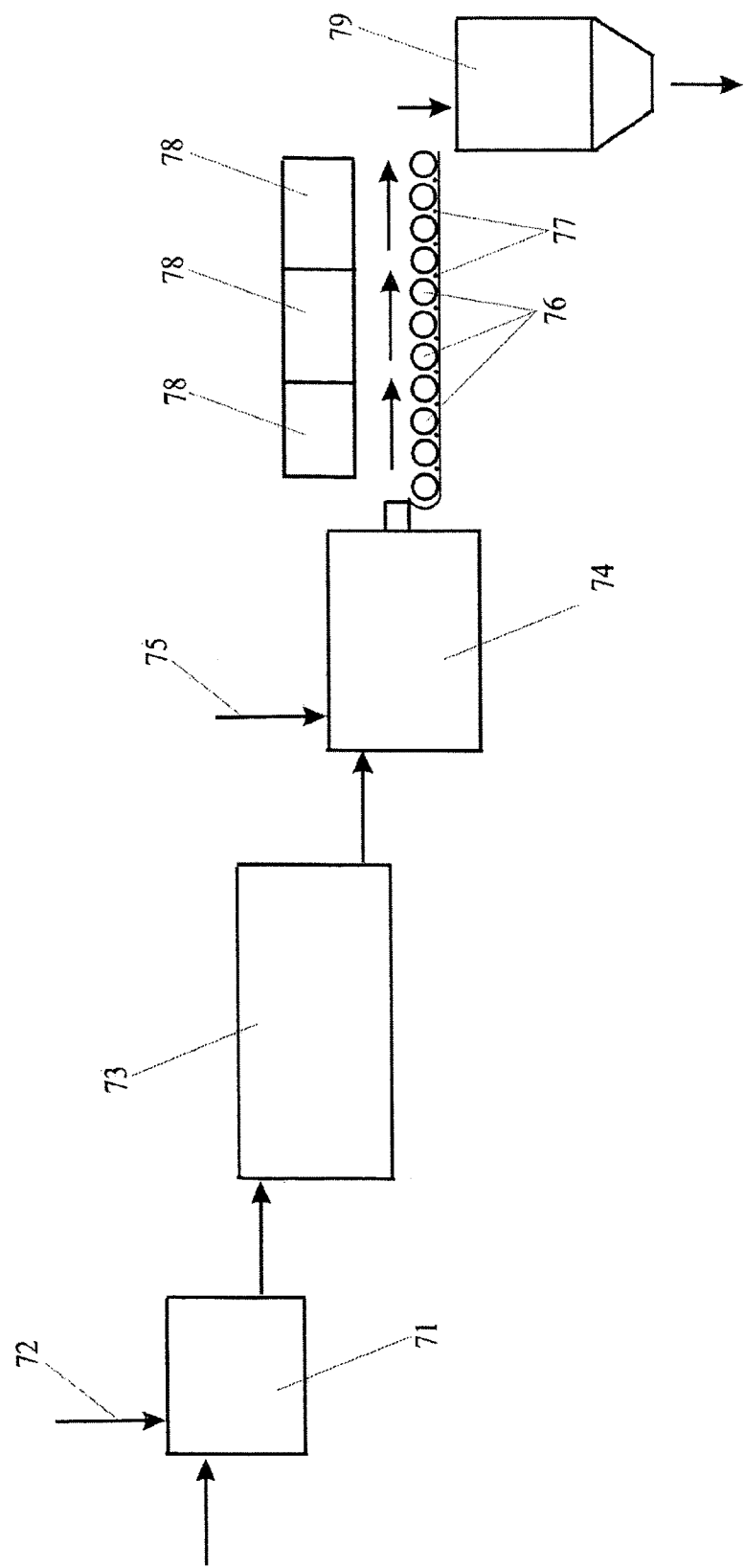
FIG. 17: excess sludge treatment flow scheme.

The plant for deep biochemical treatment of the sewage whose BOD reaches 1.000 mg/dm$^3$ and suspended matters 700 mg/dm$^3$, includes sewage feeding pipeline 1 connected to integrated mechanical treatment device 2 which is in its turn connected by a pipeline to vertical sand catcher 3. The collecting tray of vertical sand catcher 3 is connected by a drain pipeline to mixing chamber 4 combined with biological treatment devices 5. Combined biological treatment devices 5 consist of biofilters 6 with feed 7 provided with spray lines 8, collecting trays 9, and drain collectors 10. The drain collectors have aeratic columns 11 attached to them, which are sunk in aeration zones 12 of aeration tank-settlers 13. The partition separating the biofilter space from the air-tank separator space, should have valves or holes for air bypass 14. Aeration settling tanks 13 of aeration zones 12 are separated from settling zones 15 by partitions 16. The outer perimeter of the conic part of the bottom of air-tank separator 13 has sludge draining pipeline 17. Sludge draining pipelines 17 are connected to mixing chamber 4 that has circulation pump 18. Head pipeline 19 is connected to both spray lines 8 of combined biological treatment devices 5 and to excess sludge treatment device 20.

The collecting trays mounted in settling zones 15 are connected by a gravity pipeline with bioreactors 21. The bioreactor includes aeration chamber 22 with water-jet aerator 23 and pump 24. In its turn, pump 24 is connected to head pipeline 25 with water-jet aerator 23, mixing chamber 4 and spray line 26 of bioreactor 21. Aeration chamber 22 is separated by a partition from the sunk filter containing feed 27. Combined biological treatment devices 5 and bioreactors 21 are connected by air ducts 28 to fan 29 of used air treatment device 30.

Biofilter 6 spray line structure includes head pipeline with shutter 31, distributing trays 32 with gates 33, emptying fittings 34 and reflecting disks 35. Primary emptying fittings 34 have training plates 36 before them. Trays 32 are equipped with helium-neon lasers 37.

The bottom of drain collector 10 has welded sockets 38 whose lower parts have screwed-in aeratic columns 11, and upper parts have fittings 39. During pure water hydraulic testing, they mark the water level upon the fittings, then the fittings are screwed out, beveled and then screwed in sockets 38 again. Fittings 39 have heliciform hollows. The drain collector is equipped with training reflector 40 and actuator access 41.

The biofilters feed is made of corrugated ceramic sheets 42 with a frame of parallel and wavy longitudinal bands 43. Some part of longitudinal bands 44 are shaped as wavy partitions. The surface of sheets 42, except for bands 43, is characterized by evident coarseness, i.e. claws 45.

The artificial feed for biofilters may be feed elements 46 made as spheres with cavities on their surface 47, whose axes cross in the center of the sphere.

The combined biological treatment devices have a bottom of air-tank separator 13 separated into cells by triangular rollers 48 that have blocks with biological feed 49 above them. The flat sections of aeration tank 13 bottom have aeratic columns 50. The outer perimeter of the conic part air-tank separator 13 bottom has sludge draining pipeline 17 with evenly located holes or fittings 51.

The collecting tray of air-tank separator 13 is connected by a pipeline to bioreactor 21. Artificial feed 27 of bioreactor 21 is made of plastic or ceramic sheets 52 that have pivots or plates 53 attached to them. The sheets are made with holes 54. The sheets, pivots or plates have claws 55.

The pending variant of a plant for integrated treatment of household and industrial sewage with the content of organic impurities in BOD making up to 1,500 mg/dm$^3$, suspended matters up to 700 mg/dm$^3$, total sulphuretted hydrogen and hydrosulfides, ammonium nitrogen up to 100 mg/dm$^3$, also includes sewage driving pipeline 1, integrated mechanical treatment device 2, sand catcher 3, and mixing chamber 4 with circulation pump 18 installed inside it. Mixing chamber 4 is connected by a free-flow pipeline to first combined biological treatment device 56. In its turn, the collecting tray of combined device 56 is connected by a pipeline to mixing chamber 57 of second biological treatment device 58. Pipeline 59 running to mixing chambers 4 and 57 connects mixing device tank 60 with hydrogen peroxide solution. Head pipeline 61 of circulation pump 18, mounted in mixing chamber 4, is connected to spray line of the biofilter of combined biological treatment device 56, mixing chamber 57 of device 58 and mixer 62. Biofilter of device 56 is filled with feed of spherical elements 46. Head pipeline 63 of circulation pump 18, mounted in mixing chamber 57, is connected to biofilter spray line of device 58 and to mixing chamber 4. Head pipeline 63 is connected to mixer 62 mounted at the clarified liquid driving pipeline, and to excess sludge treatment device 20. Mixer 62 also has coagulant solution feeding pipeline 64 running from mixing device tank 65 connected to it. In its turn mixer 62 is connected by a pipeline to denitrifier with mechanical mixer 66. The collecting tray of the denitrifier settling zone is connected to bioreactor aeration chamber 21 with artificial feed 27. In its turn, the bioreactor is connected to sorption filter 67. Envisaged is disinfection and deodoration of the biochemically used air in device 30.

In case of purifying industrial sewage whose organic impurities make in BOD 1,500 to 3,000 $mgO_2/dm^3$, suspended matters up to 1,500 $mg/dm^3$ and fats up to 300 $mg/dm^3$, the flow scheme includes sewage driving pipeline 1, integrated mechanical treatment device 2, sand catcher 3 and sewage pumping facility 68. The pump head pipeline is connected to the feed chamber of biocoagulator-flotator 69. In its turn, the clarified liquid pipeline is connected to mixing chamber 4 of first combined biological treatment device 56 and to mixing chamber 57 of second combined biological treatment device 58. Head pipeline 63 of circulation pump 18 mounted in mixing chamber 57, is simultaneously connected to biofilter spray line of device 58, mixing chamber 4, feed chamber of the water-jet aerator of biocoagulator-flotator 69 and to excess sludge treatment device 20.

If the organic impurities concentrations make in BOD 3,000 to 50,000 $mg/dm^3$, the head pipeline of pumping facility 68 is connected to the feed chamber of biocoagulator-flotator 69 or to anaerobic bioreactor 70. In its turn the anaerobic bioreactor is connected to mixing chambers 4 and 57. If the flow scheme lacks biocoagulator-flotator, head pipeline 63 of circulation pump 18, mounted in mixing chamber 57, is only connected to the biofilter spray line of device 58, to mixing chamber 4, and to excess sludge treatment device 20.

Depending on the accepted flow scheme, the excess sludge pipelines run from combined biological treatment devices 5, 58, denitrifier 66, biocoagulator 69, and anaerobic bioreactor 70 to thickener 71 of excess sludge treatment device 20. The same way runs reagents (coagulant and/or flocculant) delivery line 72. The thickened settlings pipeline is connected to belt filter press 73 which is in its turn connected to grainer 74, where also connected is organic and/or mineral additives delivery line 75. The granule driving device is connected to roller conveyor 76, the rollers having electric heating elements, or heating elements 77 located under the transporter. The transporter has microwave radiators 78. There also is granule collecting holding tank 79.

Used air treatment device 30 for the plants includes air ducts 28 connected to the sucking fitting of high pressure fan (HPF) 29. Head air duct of HPF 29 is in its turn connected to irrigation chamber 80 of air treatment device 30. Device 30 is provided with spray line 81 connected to circulation pump 82 whose sucking fitting is connected to its air-fit section 83. Air-fit section 83 has clip-on section 84 above it filled with artificial feed, as well as collecting tray 85 with direct air feeding pipes 86 mounted in it. Pipes 86 are 1.2 to 2.5 m long, sunk 0.4 to 0.7 m deep into the liquid of the air-fit section and filled in their lower section with small diameter pipes 87. Water-jet air ejection pipes 88 are connected to drain collector 89, mounted at a height of 0.6 to 1.8 m above the liquid and sunk in the liquid to 1 to 3 m. Air treatment device 30 has tank 90 with natrium hypochlorite solution, odorant solution tank 91 and air duct 92 connected to it. Air duct 92 is in its turn connected to water-drop eliminator 93 which is successively connected to activated carbon filter 94 and ultraviolet disinfection unit 95.

The described integrated sewage biochemical treatment plant functions as follows.

In case of integrated treatment of household and industrial sewage with the content of organic impurities in BOD making up to 1.000 $mgO_2/dm^3$, suspended matters up to 700 $mg/dm^3$, the sewage is by pipeline 1 driven to integrated mechanical treatment device 2 with 2 to 4 mm crevices, where particulate pollutants are caught. Then the sewage gets to vertical sand catcher 3 where the sand precipitates. After that the sewage gets to mixing chamber 4, and then to combined biological treatment device 5. The sludge from aeration zones 12 gets (under hydrostatic pressure) to mixing chamber 4 through free-flow pipelines 17. In case the described sewage biochemical treatment plant employs 2 to 4 combined biological treatment devices, then it has single circulation pump 18. This is conditioned by the constructive requirements for treatment plants, handling the hydrodynamic flows in the biofilters and aeration settling tanks, as well as temporary shutdowns of some elements. A large number of combined biological treatment devices and single circulation pump 18 makes it too difficult to control the hydrodynamic mode of biofilters and aeration settling tanks. A semi-industrial investigation has shown that if the number of the combined biological treatment devices is 4 to 6, it is advisable to make the mixing chamber of the treatment plants unit with two simultaneously working pumps dividing them with leaf gate partitions.

From mixing chamber 4 the sewage is driven through head pipeline 19, by circulation pump 18, to spray line 8 of biofilters 6. Pipeline 19 also drives excess sludge to device 20. Valves 31 mounted at head pipelines control the sewage flowrate to each distributing tray 32. As the sludge mixture gets to narrow distributing trays 32 at the initial sections, especially as circulation pump 18 is switched on, there is rough undulatory motion in the trays, which may result in the liquid run over the edges. Reduction of the liquid pressure and its flow leveling in the trays is all done with the help of gates 33. Due to the liquid high speed at the trays initial sections, hampered is the drain of the liquid to first drain fittings 34. To reduce the stream turbulence before the initial fittings, there are training plates 36 favoring the drain of the liquid to the fittings holes.

The liquid flow through the fittings is controlled by way of altering the fittings height above the trays bottoms. At the same time one should try to reduce the length of the fittings as it reduces the amount of the biomass attached inside the fittings and correspondingly raises their delivery capacity. The recommended length of the fittings mounted at the beginnings and ends of the trays is 2 to 6 diameters. The density of the falling jets is raised due to the hollows of drain fittings 34 made as 1 to 1.5 revolution spirals with a height of less than 0.7 diameters.

The optimal proportion between the consumption of power for spray line work and irrigation evenness defines the following parameters of the system: in case the distance from the upper ends of the emptying fittings of the trays of the spray line to the reflecting disks is 0.8 to 2 m, the distances between the centers of the trays and the distances between the axes of the fittings should stay within the limits of 0.6 to 1.8 m.

The biofilters feed of devices 5 is made of corrugated ceramic plates 42. Inclusion of metal compounds in the material raises the electrokinetic potential of the material adsorptive layer. Electrostatic adhesion immobilizes the colonies of microorganisms. Frame 43 of thickenings is made as parallel and longitudinal bands and longitudinal bands with outstanding wavy partitions 44 provides strength of the construction as the weight of the biomass layer grows. The attached microflora layer is directly influenced by the coarseness made as claws 45 (0.1 to 1.5 mm). Reduction of bands 43 coarseness down to 0.1 to 0.5 mm reduces cohesion with the feed material, which alongside with wavy partitions 44 favors reduction of size of the possible silting zones and excess biomass discharge.

The feed surface forms a layer of attached biomass whose thickness reaches 10 mm, which (apart from the microflora sorbing and oxidizing the organic understratum—50 to 70% of the solved organic matters) develops nitrifying and denitrifying microorganisms.

Inclusion of metal particles in feed 7 material raises the electrokinetic effect which increases the potential of the adsorptive feed layer. A semi-industrial testing showed compact biomass accumulation (whose thickness reached 5 to 7 mm) on the sheets with metal compounds electroacoustical sputtering due to implantation in the feed surface layer of various compounds like carbides, carbonitrides, intermetals, etc. These metal inclusions are catalyzers raising the dynamic activity of the microorganisms. The feed active centers sorb reacting substance molecules, their concentration raises, which positively effects the adhesion of the surface layer. Combination of the structural-mechanical, kinetic and electrical factors stabilizes nitrification and denitrification thus raising the degradation level of the nitrogen-containing impurities in the plant.

Laser radiation treatment of the circulating sewage and active sludge mixture in the biofilters spray line trays with the help of helium-neon lasers 37 in a scanning mode stimulates the growth of the active biomass bacteria, especially the growth of the nitrifying and denitrifying microorganisms. Test sludge radiation treatment with helium-neon lasers, the wave-length being 632.8 nm, during 3 minutes showed a 5.9 time growth of bacteria number within 1 hour after the treatment. Rise of the microorganisms biological activity reduces the negative effect of the microflora overload in case of an abrupt rise of organic and hydraulic plant loads.

The sewage-and-sludge mixture, after it has passed feed 7 of biofilters 6, is collected with the help of trays 9 and driven to drain collectors 10. Disorganized drain of liquid, insufficient distance between the centers of the upper cuts of aeration columns 11, deviation in the fittings heights above the drain collectors bottoms, all cause chaotic movement of liquid, which results in a lower effectiveness of air entraining in the aeration columns. That is why the upper section of the drain collectors should have training reflectors 40 to accept and drive down the liquid flow. Pressure extinction favors even liquid flow to the upper cuts of the aeration columns. The recommended distance between the columns cuts of 25 to 100 mm diameter in the upper section within the limits of 50 to 500 mm reduces the turbulence of the liquid flows in collectors 10 and favors its even distribution between the columns. Exact orientation of the upper cuts of the columns on the water level is done by way of fittings 39 screwing in and out, and beveling. Strong vortex cavities for sucking air in aeratic columns 11 are favored by heliciform inner hollows in fittings 39 since they stabilize clockwise revolutions as the liquid flows into the pipes. As shown by a semi-industrial investigation, the optimal height of rifling is between 0.5 diameter. Fittings 39 are mounted and aeration columns 11 cleaned through accesses 41.

The effectiveness of air oxygen mass transfer into the liquid and aeration zone content stirring depends on the following major factors: aeration columns diameter, liquid capacity (m3/h), proportion between the aeration columns height above the liquid and the height of the columns sunk section, aeration zone depth, columns placement in the aeration zone and air-tank separator configuration.

The aeration columns inner diameters are recommended to stay between 40 and 70 mm. 25 to 40 mm diameters are also acceptable for smaller capacity range plants, yet in this case the m$^3$/h capacity and the amount of the involved air are especially badly influenced by the fact that the inside of the pipes biocenosis' fouling is $\beta\approx 1.5$ mm, due to which the pipes should be regularly cleaned. Application of 70 to 100 mm diameters (with a larger bypass through the columns) also provides a higher coefficient of mass transfer ($C_s$) within the pipes capacity (for example if $d_y$ is 70 mm q=9 to 19 m$^3$/h), yet this reduces the stirring effectiveness of the whole content of the aeration zone. To provide sufficient shock of the air-water torches on the bottom, the recommended design liquid flow (m$^3$/h) through the columns should be not less than half of the total of the minimum and maximum capacities forming vortex cavities.

Proceeding from the optimum values: power consumption for liquid circulation through the biofilter to the aeratic columns—the aeration tank—the mixing chamber, the treatment plant construction depth and aeration columns maintenance, the recommended height of the columns above the liquid level in the aeration tank for the combined biological treatment devices capacity range of 5 to 50 m$^3$/day, is 1.2 to 1.8 m, the columns sunk section is recommended to stay between 1.5 and 2 m, while the columns lower cuts height above the bottom should stay between 0.05 and 0.2 m; if the capacity range is 100 to 15,000 m$^3$/day, the columns upper section height should be between 2 and 3.5 m, the columns sunk section height between 2.5 and 4 m, the columns lower cuts height above the bottom between 0.15 and 0.4 m. The distance between the lower cuts of the adjacent aeration columns (25 to 100 mm) and those columns mounted diagonally should be 0.5 to 3 m. To reduce the size of the aeration tank's bottom recommended are triangular rollers 48 mounted at the flat section of the aeration zone bottom. The optimum size of rollers 48, proceeding from the conditions of the reaction zone maximum size, sludge liquid stirring effectiveness and avoidance of sludge deposition, are as follows: width 0.5 to 2.0 m; height 0.5 to 1.5 m. In case of sedimentation of sludge flakes within settling zone 15 of air-tank separator 13 there can be formed stagnant zones where the conic and flat sections of the aeration tank's bottom articulate, with further decay and emersion of defunct sludge. That is why the minimum distance from the lower ends of the outermost columns of 25 to 50 mm diameter to the corner should not exceed 0.5 to 0.7 m, while for 50 to 100 mm diameters the same should not exceed 0.7 to 1.2 m. The length of the lower leg of settling zone 15 conic part should make one half of the settling zone width plus 0.1 to 1.0 m. At the same time the distance from the bottom of the conic part of the partition separation aeration and settling zones, to the bottom should make 0.5 to 1.5 m. To prevent reduction of the shock of the gas-and-liquid flows leaving the lower ends of aeration columns 11, the sludge mixture pipeline and correspondingly deterioration of the hydrodynamical conditions of stirring the content of air-tank separator 13, pipeline 17 is mounted beyond the outward perimeter of the conic part of the air-tank separator bottom with holes or fittings 51 located under the angle of 0 to 90° to the long axis of the pipeline and at a distance of 0.2 to 1.0 m from each other.

In case followed are all the mentioned parameters of aeration columns and air-tank separator structural devices placement, the water-air torches shock on the aeration zone bottom, the hydrodynamical movement of the fluid flows, and air bubbles emersion exclude any active sludge deposition and decay.

To fasten and develop the microflora oxidizing the organic matters and carrying out nitrification, the aeration zones reservoirs of the aeration settling tanks of the combined biological treatment devices have, above rollers 48, biological feed blocks 49 made of plastic plates with holes, of 3 to 30 mm and 5 to 50 mm long bristles. Blocks 49 may also be made of ceramic sheets with holes of 3 to 30 mm and claws shaped as 5 to 40 mm long pivots or plates. The sheets, pivots or plates have evident coarseness in the form of claws. This coarseness favors immobilized microflora attachment on the feed surface. Inclusion of metal compounds in the material raises the electrostatic adhesion of microflora, which alongside with the reduction of turbulence of the liquid flows inside the feed, favors older nitirifying sludge development. Reduction of the liquid flows turbulence in the feed reduces carrying-out of the adapted active sludge. The concentration of the active biomass within sunk feed 49 may reach 10 g/dm$^3$.

The reaction volumes of the aeration and settling zones oxidize the rest part of the organic impurities (30 to 50%) under low loads upon the sludge≈0.1 to 0.2 g·BOD/$g_{sludge}$·day, mineralization of the waste biomass of the biofilters feeds. The ash content of the sludge during developed nitrification and partial denitrification equals 33 to 42%, the average water yielding capacity specific resistance is 38 to 45·10$^{-10}$ cm/g. The excess sludge contains carbon, nitrogen, phosphorus and trace elements, is characterized by high mineralization, fine water yielding capacity, does not decay and thus, after additional treatment, may be used as a fertilizer.

The purified water is drained from settling zones 15 to the collecting trays and driven to integrated sewage afterpurification bioreactors 21, where, in aeration chambers 22, is additionally saturated with dissolved oxygen with the help of water-jet aerators 23 and circulation pumps 24. Pumps 24 are equipped with flexible hoses controlling the sinking depth. After that the water passes feed layer 27.

The bioreactors feed may be made of plastic or ceramic plates 52 with attached 10 to 100 mm long pivots or plates 53 and 3 to 30 mm diameter holes 54. These holes optimize the hydrodynamic mode of the liquid inside the bioreactor at biomass swells (which raises the feed volume application factor). The feed surface develops specific biocenosis using during its lifetime the residual concentrations of the organic matters and ammonium nitrogen. The coarseness (claws 55) favors immobilized microflora better attachment. To intensify attached biomass formation on the feed surface, the feed is activated by way of inclusion of metal compounds into its composition. The liquid driven from devices 5 to bioreactors 21 also contains light flakes of defunct sludge. As the water moves through feed 27, the flakes are physically caught due to liquid filtering through biocenosis, which is favored by smaller distances between the pivots or plates in the feed upper section (3 to 5 mm) and formation of a 1 to 1.5 mm thick microflora layer in them.

The attached microflora formed on the surface of feed 27 sorbs and oxidizes the residual organic impurities and further transforms the nitrogen-containing compounds. These biological processes are supplied with required air oxygen with the help of pump 24 and water-jet aerator 23. As suspended matters accumulate, bioreactors 21 are partially emptied and the feed regenerated with the help of spray line 26 and pump 24. Then the pump is sunk in the bioreactor pit and the liquid pumped away through pipeline 25 to mixing chamber 4 of devices 5.

Pipeline 19 delivers all excess sludge to excess sludge treatment device 20. The air from integrated mechanical treatment device rooms 2, sand catchers 3, combined biological treatment devices 5, bioreactors 21 and devices 20, is taken away by fan 29 and driven to used air treatment device 30.

In case of integrated treatment of household and industrial sewage with the content of organic impurities in BOD making up to 1,500 mgO$_2$/dm$^3$, suspended matters up to 700 mg/dm$^3$, sulphuretted hydrogen and hydrosulfides, ammonium nitrogen up to 100 mg/dm$^3$, the sewage is driven through pipeline 1 to integrated mechanical treatment device 2, and then to sand catcher 3. From the collecting tray of sand catcher 3 the waste water gets to mixing chamber 4 where it is mixed together with the circulating sludge liquid of first combined biological treatment devices 56 and with 30 to 35% hydrogen peroxide solution driven through pipeline 59 from mixing device tank 60. Then the mixture of sewage, sludge and reagent is pumped by circulation pump 18 to head pipeline 61 to the spray line of biofilter devices 56. After that the liquid passes the feed of biofilter 46, is drained to aeratic columns, and then mixed with the active sludge of the air-tank separator. Introduction of a reagent in device 56 oxidizes sulphuretted hydrogen and hydrosulfides turning them into colloid sulphur and sulphates and reducing their inhibitory effect on the biocenosis. Above all, according to the investigations, the concentration of the oxygen dissolved in the waste water rises up to 5 to 6 mg/dm$^3$, which intensifies biological treatment. Introduction of hydrogen peroxide in the mixing chamber of the first combined biological treatment device is advisable if the restored sulphur compounds concentration exceeds 20 mg/dm$^3$. The hydrogen peroxide doze was empirically defined taking into account the initial concentration of the restored sulphur compounds, and it makes 10 to 100 mg/dm$^3$.

In case of multiple irrigations and contacts between the waste liquid and the biocenosis of the biofilter feed surface, and active sludge of the reaction zone of the air-tank separator (1 to 3 hours), sulphuretted hydrogen undergoes degasification, the restored sulphur compounds are reagentally and biochemically oxidized, the organic impurities are biodegraded 50 to 70% in BOD, and there is partial denitrification (10 to 15%). The formation of a specific microflora (sulphurbacteria, filamentous, thionyl microorganisms, anammocs-bacteria) sorbing and oxidizing hydrosulfides, as well as carrying out partial denitrification in biofilter devices 56, is favored by spheric elements 46 with 8 cavities 47 whose axes meet in the center of the sphere. Microflora attachment and development is favored by the coarseness of the feed elements surface (0.1 to 1.5 mm), reduction of turbulence and longer time of contact between the defluent liquid and the biomass of the feed reservoirs. Advisable also is to use elements with 4 to 10 cavities. Long-term industrial investigations have shown that the optimal diameter of the spherical elements is 70 mm as in this case the feed is not silted. At the same time, as purified is sewage with the content of the organic impurities in BOD less than 100 mg/dm$^3$, one can use feed elements of a minimum diameter of 35 mm, even if BOD concentrations exceed 300 mg/dm$^3$ to 100 mm. In the production of elements for electrostatic adhesion and catalytic effect on microflora, it is advisable to use clays with a high iron and aluminium content. The ceramic feed material may additionally include high-melting metal compositions.

Pumping into inlet chamber 4 of first device 56 of some part of the circulation liquid from head pipeline 63 of second device 58 reduces organic matters load on the biocenosis of first device 56 (thus microflora overload is avoided). The excess biomass containing significant amounts of adsorbed unoxidized organic matters of device 56 is mineralized in device 58. With this purpose the introduced sludge is pumped through pipeline 61 to mixing chamber 57 of device 58.

After that the clarified liquid of settling zone device 56 is driven to mixing chamber 57 of device 58. At the same place, through pipeline 1, driven is some part of the initial sewage, and through pipeline 59 driven is hydrogen peroxide solution of reservoir 60. Introduction of hydrogen peroxide to mixing chamber 57 of second device 58 is advisable in case the residual restored sulphur compound after the first combined device exceeds 5 mg/dm$^3$. Then the mixture of sewage, sludge and reagent is pumped through head pipeline 63 with the help of circulation pump 18 to the spray line of device 58 biofilter, where the remaining part of the organic impurities is further sorbed and oxidized. At this stage and in case the organic matters load on the sludge is low (0.05 to 0.2 kg/BOD per 1 kg of ash free substance), there is complete organic impurities oxidation and fine nitrification and partial denitrification of nitrogen-containing compounds. The period of the sewage stay is 4 to 7 hours. To activate biological treatment in case of microflora overload within device 56, 10 to 30% of the circulating liquid is pumped from head pipeline 63 of combined biological treatment second device 58 to mixing chamber 4 of device 56. If the content of ammonium nitrogen in the initial sewage exceeds 30 mg/dm$^3$, the denitrifier 66 substratum is some part of sludge mixture of device 58, which is pumped through head pipeline 63 to mixer 62. The sludge liquid is also partially pumped from pipeline 63 to excess sludge treatment device 20.

The biofilters feed of devices 56, 58 may be made of spherical elements 46 and/or corrugated ceramic plates 42.

To attach and develop the microflora oxidizing hydrosulfides and carrying out nitrification, biological feed blocks 49 should be installed within the reservoirs of aeration settling tanks zones of devices 56 and/or 58.

After that the purified waste water of the settling zone of device 58 gets to mixer 62, where, by circulation pump 18, also driven is the sludge liquid (substrate) of mixing chamber 4 of first device 56, or substrate of mixing chamber 57 of second device 58. Mixer 62 may accept 2 to 5% of the coagulant solution for reagent removal of phosphates. The resulting mixture is driven through the pipeline to the denitrifier with mechanical mixer 66. When in the denitrifier, nitrates nitrogen is transformed into volatile nitrogen forms. Soluble phosphates interact with the coagulant hydrolysis product, which results in the formation of coagulate precipitating together with active sludge in the lower section of denitrifier 66. The result is that the waste water, after is has passed the denitrifier, reduces its nitrite and phosphates nitrogen concentrations. An experimental investigation has demonstrated that the most effective coagulant is aluminium-containing coagulant modified by activated carbon. The coagulant doze in $Al_2O_3$, in view of the amount destined for the active sludge sorbtion of the coagulant hydrolysis products, makes 20 to 60 mg/dm$^3$.

Coagulant introduction further intensifies dehydration in excess sludge treatment device 20.

After that the waste water is driven through the collecting tray of denitrifier 66 by pipeline to aeration chamber 22 of bioreactor 21 equipped with water-jet aerator 23 where the volatile nitrogen is blown away and the liquid saturated with air oxygen. Then, as the liquid moves bottom-up, it contacts with artificial feed 27.

If the purification quality is to be raised in BOD and suspended matters up to 3 mg/dm$^3$, phosphorus up to 0.2 mg/dm$^3$, and ammonium nitrogen up to 0.4 mg/dm$^3$, the treatment flow scheme is added by sorption filter 67. The waste water is driven to afterpurification filter 67 with a two-layer feed. Contacting with the first layer, the biologically purified waste water is freed from fine particles like sludge flakes and alumophosphates hydroxocomplexes; contacting with the other layer removes dissolved orthophosphates resulting from chemical adsorption due to the intermolecular interaction between orthophosohates and the feed grains surface. The feed materials of bioreactor 21 and filter 67 are regularly regenerated with pumps 18.

The sludge and settlings of bioreactor 21 and filter 67 are driven away through the head pipeline of excess sludge treatment device 20 or in the mixing chamber of devices 56 and 58.

In case of treatment of industrial sewage with the content of organic impurities in BOD making 1,500 to 3,000 mgO$_2$/dm$^3$, suspended matters up to 1,500 mg/dm$^3$ (ash content exceeding 30%), and fats up to 300 mg/dm$^3$, the sewage being first mechanically purified in devices 2, 3, is driven by pump station 68 to biocoagulator-flotator 69.

Advisability of including biocoagulators in the treatment flow scheme is stipulated by the following: suspended matters precipitation (50-70%); partial removal of organic impurities (15-20%) due to the sorption properties of the removed excess sludge, flocculation and flotation; excess biomass and impurities compaction (7 to 15 g/dm$^3$) before these are driven to the mechanical dehydration section; partial organic loads and pH averaging.

The inlet chamber of the water-jet aerator of biocoagulator-flotator 69 also receives, through pipeline 63, the active sludge of mixing chamber 57. The feed chamber has 0.3 to 1.5 m long aeratic columns attached to it, their canting angle to the pintle being 0 to 50° C. equipped with tangentional fittings. The liquid flow brings, through the aeratic columns, air $q_b \approx 0.8$ m$^3$/m$^3$ liquid (per a single column). The sewage-and-sludge mixture is revolved within biocoagulator-flotator 69 with the help of columns with tangentional fittings. The sludge-to-water contact lasts within the flocculation chamber 8 to 20 min. Those fat particles floating with the air bubbles are removed by the liquid undulating movement to the collecting tray. The effectiveness of fat removal in the biocoagulator-flotator makes 60 to 80%. After the flocculation chamber, the sludge mixture moves through the expansion cone to the settling zone where the sludge mixture is divided. After that the settled waste liquid is driven to the mixing chambers of combined biological treatment devices 56 and 58 where the remaining fats (60 to 100 mg/dm$^3$) and dissolved organic matters are sorbed and oxidized.

In case of treatment of industrial sewage with the content of organic impurities in BOD making 3,000 to 50,000 mgO$_2$/dm$^3$, suspended matters up to 1,500 mg/dm$^3$, the sewage, after its mechanical treatment, is driven through the pipeline to biocoagulator-flotator 69 and/or directly to the lower section of anaerobic bioreactor 70.

The pipes driving liquid to device 70 are evenly placed along the perimeter, the distances from the conic part of the bottom being 100 to 200 mm, which provides even distribution of upward flows within bioreactor 70 and washing of the settling anaerobic sludge. The incoming sewage contacts with the sludge mixture (biomass concentration≈10 to 20 g/dm$^3$) in a counterflow mode during 1 to 8 hours. The sewage-and-sludge mixture is stirred with the help of the circulation pump intaking the settling sludge from the lower section of the anaerobic bioreactor and driving it through the pipeline to the upper section of the reactor. The sludge is introduced and its content stirred with the help of a distribution system consisting of several 0.3 to 2.5 m long pipes, their canting angle to the pintle being 0 to 70° C. equipped with tangential bends revolving the sludge mixture in the reactor.

The anaerobic sludge sorbs and oxidizes 50 to 70% of the organic impurities and 60 to 80% of the suspended matters.

Methane fermentation raises the concentration of sulphuretted hydrogen and hydrosulfides up to 100 mg/dm$^3$ and decreases the environment pH down to 4-5.

After that the liquid driven from the anaerobic bioreactor is directed through the pipeline to the mixing chamber of combined biological treatment devices 56, 58. Then the sewage-and-sludge mixture, through head pipeline circulation pump 18 mounted in the mixing chamber of first combined device 56, is driven to the spray line of devices 56, as well as to the mixing chamber of second combined device 58. Through the head pipeline of circulation pump 18 mounted in mixing chamber 57 of second combined devices 58, the sludge mixture is driven to the spray line of device 58, to mixing chamber 4, and to excess sludge treatment device 20. To the same places also driven is the condensed precipitate of the conic part of biocoagulator 69 and/or anaerobic bioreactor 70.

The design features of combined biological treatment devices, the two-stage scheme with successively connected combined biological treatment devices and hydrogen peroxide application provide complete removal of sulphuretted hydrogen and hydrosulfides.

Negative pH effect on aerobic purification successively decreases due to waste liquid repeated dilution with circulating active sludge in the mixing chambers and sludge mixture contacting first with the biocenoses of the biofilters adapted to low pH values.

Depending on the accepted treatment flow scheme, device 20 has excess sludge pipelines running to it from combined biological treatment devices 5, 58, anaerobic bioreactor 70 and denitrifier 66. There is also a possibility of connecting biocoagulator 69 to device 20. The pipelines are connected to thickener 71 of devices 20. If there is a need to raise the effect of sludge and settlings thickening, to the thickener also connected is coagulants and/or flocculants delivery line 72. Then the condensed precipitate is driven to band filter press 73, where formed is cake of predetermined humidity of 75 to 85%. Dehydrated cake goes to grainer 74 where also connected is delivery line for organic and/or mineral additives 75. The organic and mineral additives may be saw dust, sunflower seed husk and mineral fertilizers. The grains get from 74 to transporter rollers 76 with built-in electric heating elements 77. Heating elements 77 may also be placed under the roller transporter and heat the grains. Revolving rollers have claws moving the grains. Microwave radiators 78 mounted above the transporter additionally dry and dehelmintize the grains content. After that the grains are poured in collecting tank 79.

The air from the mechanical, biological treatment and aftertreatment devices is driven by fan 29 to air treatment device 30 where it initially passes through irrigation chamber 80 where it contacts with sodium hypochlorite solution fed to irrigation system 81 by circulating pump 82. Irrigation and movement of air and natrium hypochlorite solution drops through the artificial feed of section 84 results in interphase contacting. After that the air, through direct supply pipes 86, is driven to bubble section 83 where air bubbles once again contact the solution. Availability, in the lower section of pipes 86, of smaller diameter pipes 87, divides the outlet air into little bubbles, which favors better surface contacting between the phases. The rising air, by air duct 92, gets to drop separator 93. As the liquid flows through collecting tray 85 to drain collector 89 and after that to water-jet air ejection pipes 88, some part of the air getting to device 30 (0.5 to 0.7 m$^3$/m$^3$ of the liquid) is sucked in the pipes. Further emersion of the air bubbles stirs the contents of air-fit section 83 and intensively renews the gas-to-liquid contacting surface of the whole contents. New solution is injected from hypochlirite tank 90. In case of emergency, odorant can be delivered from tank 91.

The air, after its wet purification in air duct 92, gets to drop separator 93. After that the air is driven for aftertreatment to ultraviolet disinfection devices 95.

A malfunction in sewage biochemical treatment may result in a whole process breakdown and consequently in objectionable odors. That is why, as the treatment plant is in emergency operation, the air treatment flow scheme should include activated carbon filters 94 which, together with odorants, completely exclude any objectionable odors. Ejection of a little part of small hypochlorite droplets from drop separator 93 prevents formation of microflora within the activated feed pores. Heating (feed regeneration) usually takes place in the post-fault period. After the air has passed carbon filters, it is driven to ultraviolet disinfection devices 95.

It is advisable to use the integrated sewage biochemical treatment plant for the purification of household and industrial sewage produced by dwelling-houses, villages, towns and cities, meat-packing plants, fish processing plants, canneries, cattle breeding farms, yeast factories, breweries, sugar-mills, pulp and paper mills, chemical and microbiological enterprises, etc.

The level of purification of household and industrial sewage with BOD making 100 to 1,500 mg/dm$^3$, suspended matters up to 700 mg/dm$^3$, is 98 to 99%. In case the sewage BOD is only 50 to 100 mg/dm$^3$, the plant's biofilters perform sorption and oxidation of 70 to 80% of the organic impurities. The biomass separated from the biofilter feed replenishes the suspended sludge layer in the air-tank separator, which brings the purification effect up to 99%.

As shown by semi-industrial and industrial testings, the pending integrated biochemical treatment plant provides complete removal of sulphuretted hydrogen and hydrosulfides, reduction of the ammonium nitrogen concentration from 100 mg/dm$^3$ down to 0.5 mg/dm$^3$ and phosphorus down to 0.2 mg/dm$^3$.

Inclusion of biocoagulators-flotators in the flow scheme of sewage two-stage biological treatment with combined devices brings the parameters of concentrated sewage (BOD content up to 3,000 mg/dm$^3$, fats up to 300 mg/dm$^3$ and suspended matters up to 1,500 mg/dm$^3$) to the values equaling 10 to 15 mg/dm$^3$.

Inclusion of anaerobic bioreactors in the flow scheme of the integrated sewage biochemical treatment plant provides effective strong sewage purification (BOD content up to 50,000 mg/dm$^3$).

The proposed plant solves a complex problem of sewage treatment, used air treatment and valuable granulated fertilizer production.

As compared to conventional aeration plants, the consumption of the power needed for biochemical treatment is 2 to 3 times less; the personnel reduces by 50 to 70%; the treatment plants area is also 3 times less, and the sanitary-hygienic zone may be 50 to 100 m depending on the plant capacity.

Thus, the invention relates to the purification of household and industrial sewage with the content of organic impurities in BOD making 50 to 50,000 mg/dm$^3$, suspended matters from 50 to 1,500 mg/dm$^3$, fats up to 300 mg/dm$^3$, hydrosulfides and sulphuretted hydrogen, ammonium nitrogen up to 100 mg/dm$^3$ and can be used for the treatment of the waste water produced by dwelling-houses, villages, towns and cities, meat-packing plants, fish processing plants, canneries, cattle breeding farms, yeast factories, breweries, sugar-mills, pulp and paper mills, chemical and microbiological enterprises, etc.

The objective as viewed by the designers of the new integrated sewage biochemical treatment plant was to create such variants that would provide efficient and steady quality of purification of sewage characterized by high contents of organic impurities, sulphuretted hydrogen, hydrosulfides, ammonium nitrogen, and would raise the environmental safety of the purified sewage.

The technical result achieved by the designers as they solved the problem set forth, was a high level of sewage and used air purification, as well as valuable granulated fertilizer production.

The character of the invention is that the integrated sewage biochemical treatment plant containing mechanical treatment devices, a sewage-and-sludge mixing chamber with a circulation pump and a combined biological treatment device, including a plane feed biofilter, a spray line, collecting trays and drain collectors connected to water-jet aeratic columns sunk in the aeration zones, and aftertreatment devices; the combined biological treatment device whose capacity is 5 to 15,000 m$^3$/day has a biofilters spray line that includes trays with emptying fittings and reflecting disks, the distance from the trays emptying fittings upper ends to the disk reflectors is 0.8 to 2 m, and the distance between the trays centers and the distance between the trays fittings axes is 0.6 to 1.8 m. In case the aeration columns diameter is between 25 and 100 mm, their height above the liquid level in the aeration settling tanks is 1.2 to 3.5 m, and the sinking height under the liquid level is 1.5 to 4 m. At the same time the distance between the columns upper cuts is 50 to 500 mm and the distance between the lower cuts of the aeration columns is 0.5 to 3 m.

What is being claimed:

1. An integrated sewage biochemical treatment plant comprising:
   at least one mechanical treatment device;
   a sewage-and-sludge mixing chamber with a circulation pump and connected to the at least one mechanical treatment device;
   a combined biological treatment device of from 5 to 15,000 m$^3$/day capacity, connected with the sewage-and-sludge mixing chamber, and including a biofilter and aeration zones, the biofilter comprising a plane feed, a spray line, collecting trays, and drain collectors, the aeration zones comprising aeration settling tanks and comprising water-jet aeratic columns sunk in the aeration zones, and the drain collectors being connected to the water-jet aeratic columns; and
   at least one aftertreatment device connected with the combined biological treatment device;
   wherein within the combined biological treatment device, the spray line includes trays with emptying fittings and reflecting disks, a distance from upper ends of the emptying fittings to the reflecting disks being from 0.8 to 2 m, and a distance between centers of the trays and a distance between axes of the emptying fittings being from 0.6 to 1.8 m;
   wherein a diameter of the water-jet aeratic columns ranges from 25 to 100 mm, a height of the water-jet aeratic columns above a liquid level in the aeration settling tanks is from 1.2 to 3.5 m, and a sinking height of the water-jet aeratic columns under the liquid level is from 1.5 to 4 m; and
   wherein a distance between cuts of upper aeration columns of the water-jet aeratic columns is from 50 to 500 mm and a distance between cuts of lower aeration columns of the water-jet aeratic columns is from 0.5 to 3 m.

2. The integrated sewage biochemical treatment plant according to claim 1, wherein a length of the emptying fittings is from two to six diameters of the emptying fittings;
   wherein a diameter of the reflecting disks is from 80 to 200 mm;
   wherein pipelines connect the sewage-and-sludge mixing chamber to the combined biological treatment device;
   wherein the pipelines have shutters;
   wherein the biofilter further comprises irrigating trays having respective beginnings and respective gates at the respective beginnings;
   wherein the pipelines connect the sewage-and-sludge mixing chamber to the irrigating trays of the biofilter; and
   wherein the biofilter further comprises training plates disposed before initial emptying fittings of the emptying fittings.

3. The integrated sewage biochemical treatment plant according to claim 2, wherein the irrigating trays comprise helium-neon lasers stimulating microflora growth, nitrification and denitrification.

4. The integrated sewage biochemical treatment plant according to claim 1, wherein the biofilter further comprises feed elements, the feed elements being spheres having a diameter of from 35 to 100 mm, having from four to ten cavities, the cavities having axes meeting in a center of the respective sphere;
   wherein the spheres have surface claws having a length of from 0.1 to 1.5 mm; and
   wherein a material of the feed elements includes combinations of metals.

5. The integrated sewage biochemical treatment plant according to claim 1, wherein the biofilter comprises a feed made of corrugated ceramic sheets having a width of from 0.5 to 1.5 m, having a height of from 0.5 to 3 m, having a thickness of from 2 to 4 mm, having surface claws having a length of from 0.1 to 2 mm, and having a frame of parallel and longitudinal wavy bands having a width and a thickness of from 3 to 10 mm;
   wherein some part of the parallel and longitudinal wavy bands are made as obtrusive wavy partitions having a width of from 10 to 35 mm; and
   wherein a material of the corrugated ceramic sheets includes combinations of metals.

6. The integrated sewage biochemical treatment plant according to claim 1, wherein a drain collector of the drain collectors of the biofilter is equipped with a training reflector;
   wherein the aeration zones comprise sockets attached to a bottom of the drain collectors;
   wherein the upper aeration columns of the water-jet aeratic columns comprise fittings twisted into the sockets; and
   wherein the drain collector is supplied with a little access to assemble fittings and for pipes cleaning.

7. The integrated sewage biochemical treatment plant according to claim 1, wherein the spray line comprises drain fittings and the upper aeration columns of the water-jet aeratic columns comprise fittings; and
   wherein the drain fittings and the fittings have from 1 to 1.5 revolutions high heliciform hollows of a height not more than 0.7 of a respective diameter of the drain fittings and of the fitting.

8. The integrated sewage biochemical treatment plant according to claim 1, further comprising a partition detaching a space of the biofilter at a distance of from 0.5 to 1.5 m from a space of the aeration settling tanks; and
   wherein an outer perimeter of the partition has holes or air bypassing valves.

9. The integrated sewage biochemical treatment plant according to claim 1, wherein a height of the cuts of the lower aeration columns above a bottom of the aeration zones is from 0.05 to 0.4 m;

wherein the aeration settling tanks comprise a tank bottom comprising a flat part and a conic part and a coupling between the flat part and the conic part; and wherein a distance from a lower section of an outermost aeratic column of the water-jet aeratic columns to the coupling between the flat and the conic parts of the tank bottom of the aeration settling tanks is from 0.5 to 1.2 m.

10. The integrated sewage biochemical treatment plant according to claim 1, wherein the aeration settling tanks comprise a tank bottom comprising a flat part and a conic part having a lower leg;

wherein the combined biological treatment device further comprises a partition separating the aeration zones from a settling zone down toward a bottom of the aeration settling tanks, the partition comprising a lower section comprising a partition conic part;

wherein a length of the lower leg of the conic part of the aeration settling tanks equals half of a width of the settling zone plus 0.1 to 1.0 m;

wherein a height of the partition conic part is from 0.5 to 1.5 m;

wherein the combined biological treatment device further comprises triangular rollers located on the flat part of the tank bottom of the aeration settling tanks, the triangular rollers having a width of from 0.5 to 2.0 m and a height of from 0.5 to 1.5 m; and wherein the combined biological treatment device further comprises a sludge draining pipeline mounted along an outer perimeter of the conic part of the aeration settling tanks and having holes or fittings, the holes or the fittings being placed under an angle of from 0 to 90° with respect to a long axis of the sludge draining pipeline and at a distance of 0.2 to 1.0 m from each other.

11. The integrated sewage biochemical treatment plant according to claim 10, wherein the aeration zones further comprise biological feed blocks disposed above the triangular rollers and made of:

plastic plates with holes having a diameter of from 3 to 30 mm and with bristles having a length of from 5 to 50 mm, or ceramic plates including metal compounds, with attached pivots or plates having a respective length of from 5 to 40 mm and claws having a length of from 0.1 to 1.5 mm.

12. The integrated sewage biochemical treatment plant according to claim 1, wherein the combined biological treatment device further comprises a sludge draining pipeline connected to the sewage-and-sludge mixing chamber such that the sludge draining pipeline removes sludge from the aeration settling tanks;

wherein the integrated sewage biochemical treatment plant further comprises at least one but no more than three additional combined biological treatment devices connected to the sewage-and-sludge mixing chamber, with each additional respective combined biological treatment device being connected to the sewage-and-sludge mixing chamber by a respective further sludge draining pipeline and having a spray line, each respective further sludge draining pipeline removing sludge from aeration settling tanks of the respective additional combined biological treatment device;

wherein the sewage-and-sludge mixing chamber comprises a circulation pump having a head pipeline; and wherein the head pipeline is connected to the spray line of the combined biological treatment device and is connected to the spray line or spray lines of the at least one but no more than three additional combined biological treatment devices.

* * * * *